(12) United States Patent
McGleenon et al.

(10) Patent No.: US 10,361,921 B2
(45) Date of Patent: Jul. 23, 2019

(54) METHOD AND APPARATUS FOR MANAGING CONNECTIONS IN A COMMUNICATION NETWORK

(71) Applicant: Openwave Mobility Inc., Redwood City, CA (US)

(72) Inventors: Patrick McGleenon, Belfast (GB); Aiden McGurn, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 426 days.

(21) Appl. No.: 15/173,160

(22) Filed: Jun. 3, 2016

(65) Prior Publication Data
US 2016/0359681 A1 Dec. 8, 2016

(30) Foreign Application Priority Data
Jun. 3, 2015 (GB) .................................. 1509582.1

(51) Int. Cl.
*G06F 15/173* (2006.01)
*H04L 12/24* (2006.01)
(Continued)

(52) U.S. Cl.
CPC .......... *H04L 41/12* (2013.01); *H04L 43/0811* (2013.01); *H04L 43/0876* (2013.01);
(Continued)

(58) Field of Classification Search
CPC . H04L 41/12; H04L 43/0811; H04L 43/0876; H04L 47/193; H04L 69/162; H04L 69/22; H04L 69/326; H04L 47/34
See application file for complete search history.

(56) References Cited

U.S. PATENT DOCUMENTS 6,181,704 B1  1/2001  Drottar et al.
7,506,036 B1 * 3/2009  Cook .................... H04L 1/1829
                                                        709/220
(Continued)

FOREIGN PATENT DOCUMENTS

WO  2014031046 A1  2/2014

OTHER PUBLICATIONS

Rusty Russell et al.: 'Linux netfilter Hacking HOWTO' Jul. 2, 2002, Retrieved from the Internet: URL:https://www.netfilter.org/documentation/HOWTO/netfilter-hacking-HOWTO.html retrieved on Jan. 18, 2018.
(Continued)

*Primary Examiner* — Ryan J Jakovac
(74) *Attorney, Agent, or Firm* — EIP US LLP

(57) ABSTRACT

Provided herein is a method of managing connections in a communication network. A first and second packet are received from a third entity intermediate to a first and second entity in the communication network. The first packet and the second packet are used to establish a third transport protocol socket and a fourth transport protocol socket at a fourth entity. Header field re-valuing information is established based at least in part on first header field value information obtained from the first packet and/or second header field value information obtained from the second packet. Header field values in a subsequent received packet are re-valued based on the header field re-valuing information, either prior to the subsequent packet being input to the third transport protocol socket or the fourth transport protocol socket or subsequent to the subsequent packet being output from the third transport protocol socket or the fourth transport protocol socket.

21 Claims, 11 Drawing Sheets

(51) Int. Cl.
*H04L 12/801* (2013.01)
*H04L 29/06* (2006.01)
*H04L 12/26* (2006.01)
*H04L 29/08* (2006.01)

(52) U.S. Cl.
CPC .......... *H04L 47/193* (2013.01); *H04L 69/162* (2013.01); *H04L 69/22* (2013.01); *H04L 69/326* (2013.01); *H04L 47/34* (2013.01)

(56) References Cited

U.S. PATENT DOCUMENTS

| | | | |
|---|---|---|---|
| 2005/0165913 A1 | 7/2005 | Coulombe et al. | |
| 2005/0185664 A1 | 8/2005 | Chaskar et al. | |
| 2007/0233877 A1* | 10/2007 | Qu | H04L 29/12377 709/227 |
| 2008/0256623 A1* | 10/2008 | Worley | H04L 63/02 726/14 |
| 2009/0059788 A1 | 3/2009 | Granovsky et al. | |
| 2009/0161680 A1 | 6/2009 | Ishikawa et al. | |
| 2010/0014419 A1 | 1/2010 | Lee et al. | |
| 2010/0098092 A1* | 4/2010 | Luo | H04L 12/4633 370/401 |
| 2012/0102148 A1 | 4/2012 | Arolovitch et al. | |
| 2014/0036674 A1 | 2/2014 | Agrawal et al. | |
| 2014/0153580 A1* | 6/2014 | Chintada | H04L 69/04 370/392 |
| 2014/0359052 A1 | 12/2014 | Joachimpillai et al. | |

OTHER PUBLICATIONS

Rahul Jain: "Design and Implementation of Split TCP in the Linux Kernel" Aug. 1, 2007 XP055501336,New Jersey, USARetrieved from the Internet:URL:http://archives.njit.edu/volO 1 /etd/2000s/ 2007 / njitetd2007-072/njit-etd2007-072.pdf.

Article 94(3) Exam Report dated Aug. 31, 2018 for EP Application No. 16172815.9.

* cited by examiner

METHOD AND APPARATUS FOR MANAGING CONNECTIONS IN A COMMUNICATION NETWORK

CROSS-REFERENCE TO RELATED APPLICATIONS

This application claims the benefit of UK Application No. 1509582.1 filed Jun. 3, 2015, which is incorporated by reference in its entirety.

BACKGROUND OF THE INVENTION

Field of the Invention

The present invention relates to a method and apparatus for managing connections in a communication network.

Description of the Related Technology

The Transmission Control Protocol (TCP) is a Transport Layer (Layer 4) protocol that provides reliable connection-oriented communication over Internet Protocol (IP) networks. The TCP beaks up messages from applications that use higher layer protocols such as the Layer 7 protocols Hypertext Transfer Protocol (HTTP) and the File Transfer Protocol (FTP) into packets or segments and transmits those packets or segments from a sending entity to a receiving entity over an IP network. The receiving entity reassembles the packets. A ThCP packet comprises a header comprising fields containing header information and a data section following the header that contains payload data. Examples of header fields include the Sequence number field, the Acknowledgement number field and the Window Size Field.

The TCP uses a three-way handshake to set up a TCP/IP connection. As illustrated in FIG. 1, in order for (in this example) a Client A and a Server B to establish a TCP/IP connection, Client A first sends a TCP SYN packet to Server B, Server B replies by sending a TCP SYN-ACK packet to Client A and then Client A sends a TCP ACK packet to Server B.

A SYN packet is indicated by a SYN bit in the packet header being set to '1', an ACK packet is indicated by an ACK bit in the packet header beings set to '1' and a SYN-ACK packet is indicated by a SYN bit and an ACK bit in the packet header both being set to '1'.

A TCP header comprises a Sequence number field and an Acknowledgment number field. The Client A sets the value of the Sequence number field in the SYN packet's header to a random whole number A#. In response, the Server B sets the value of the Acknowledgment number field in the SYN-ACK's header to A#+1 and sets the value of the Sequence number field in the SYN-ACK's header to another random number B#. The Client A sets the value of the Sequence number field in the ACK packet to the received acknowledgment value A#+1 and the value of the acknowledgment field to one more than the received sequence number i.e. B#+1.

The Client A and the Server B use the options field in the headers of the SYN, SYN-ACK and ACK packets to agree what TCP options are to be enabled over the connection and to set any necessary settings that are to be used for the TCP options that are to enabled. These TCP options may include, for example, TCP Timestamps, (which can help TCP determine in which order packets were sent), Window Scaling (the scaling value setting of which is used to increase the maximum window size over a connection) and Selective Acknowledgments (which if enabled allows the receiver to acknowledge discontinuous blocks of packets which were received correctly).

The TCP connection is managed by the operating systems at each of the Client A and the Server B by means of a programming interface known as a TCP socket that represents an end point of the TCP connection. Once the three-way handshake is successfully completed, a TCP socket is in an established state at each of the Client A (client socket) and at the Server B (server socket). Each TCP socket uses its own port number that does not change during the lifetime of the connection and an IP address of the Client A or the Server B (as the case may be) which together uniquely identify that TCP socket in the context of the TCP connection. Each port number is used locally to route data to and from the Layer 7 application that is using that particular TCP connection. Together, the two sockets define the TCP connection via the 4—Tuple {Client A port; Client A IP address, Server B port, Server B IP address}.

When the communication between the Client A and Server B ends, a 4-way handshake is performed to tear down the TCP connection between the two.

US 2014/0036674 describes a system for split TCP flow control management in a cellular broadband network. A split TCP selection logic in the cellular network determines a context for a packet of a data flow and selects for the packet either an end-to-end TCP connection or a split TCP connection. Both connections are to a content server with the end-to-end TCP connection being a direct connection whereas the split TCP connection is split in two at a proxy server.

US2014/0036674 describes an example in which deep packet inspection is performed and packets can be routed to an end-to-end TCP connection regardless of context. Then, if the split TCP selection logic determines that the flow should be handled by the TCP split proxy server (i.e. instead of the already established end-to-end connection), a hand-off to a TCP split connection is made where the flow is redirected to the TCP split proxy, and the TCP split proxy is inserted in the TCP connection.

In US2014/0036674, the semantics and other properties of the existing end-to-end connection (e.g. sequence numbers, acknowledgment numbers) are not preserved when the TCP split proxy is inserted in the existing end-to-end TCP connection.

SUMMARY

In a first embodiment of the invention, there is an apparatus for managing connections in a communication network, the apparatus comprising: at least one processor; and at least one memory including computer program code; the at least one memory and the computer program code being configured to, with the at least one processor, cause the apparatus at least to perform: receiving a first packet that is, or is a copy of, a packet sent from a transport protocol first socket at a first entity in the communication network to a second entity in the communication network; receiving a second packet that is, or is a copy of, a packet sent from a transport protocol second socket at the second entity to the first entity in response to the second entity receiving the packet or a copy of the packet sent from the transport protocol first socket, wherein the first packet and the second packet are received from a third entity that is intermediate to the first entity and the second entity in the communication network; using the first packet and the second packet in a process to establish a transport protocol third socket and a transport protocol fourth socket at a fourth entity in the communication network, wherein the transport protocol third socket is for communicating with the transport protocol first socket at the first entity and the transport protocol fourth socket is for communicating with the transport protocol second socket at the second entity; establishing header field re-valuing information based at least in part on first header field value information obtained from the first packet and/or second header field value information obtained from the second packet; re-valuing one or more header field values in a subsequent received packet based on the header field re-valuing information, either prior to the subsequent packet being input to the transport protocol third socket or the transport protocol fourth socket or subsequent to the subsequent packet being output from the transport protocol third socket or the transport protocol fourth socket.

In a second embodiment of the invention, there is a method for managing connections in a communication network, the method comprising: receiving a first packet that is, or is a copy of, a packet sent from a transport protocol first socket at a first entity in the communication network to a second entity in the communication network; receiving a second packet that is, or is a copy of, a packet sent from a transport protocol second socket at the second entity to the first entity in response to the second entity receiving the packet or a copy of the packet sent from the transport protocol first socket, wherein the first packet and the second packet are received from a third entity that is intermediate to the first entity and the second entity in the communication network; using the first packet and the second packet in a process to establish a transport protocol third socket and a transport protocol fourth socket at a fourth entity in the communication network, wherein the transport protocol third socket is for communicating with the transport protocol first socket at the first entity and the transport protocol fourth socket is for communicating with the transport protocol second socket at the second entity; establishing header field re-valuing information based at least in part on first header field value information obtained from the first packet and/or second header field value information obtained from the second packet; re-valuing one or more header field values in a subsequent received packet based on the header field re-valuing information, either prior to the subsequent packet being input to the transport protocol third socket or the transport protocol fourth socket or subsequent to the subsequent packet being output from the transport protocol third socket or the transport protocol fourth socket.

In a third embodiment of the invention, there is a non-transitory computer-readable storage medium comprising a set of computer-readable instructions stored thereon, which, when executed by a processing system cause the processing system to perform the method of: receiving a first packet that is, or is a copy of, a packet sent from a transport protocol first socket at a first entity in the communication network to a second entity in the communication network; receiving a second packet that is, or is a copy of, a packet sent from a transport protocol second socket at the second entity to the first entity in response to the second entity receiving the packet or a copy of the packet sent from the transport protocol first socket, wherein the first packet and the second packet are received from a third entity that is intermediate to the first entity and the second entity in the communication network; using the first packet and the second packet in a process to establish a transport protocol third socket and a transport protocol fourth socket at a fourth entity in the communication network, wherein the transport protocol third socket is for communicating with the transport protocol fourth socket at the first entity and the transport protocol fourth socket is for communicating with the transport protocol second socket at the second entity; establishing header field re-valuing information based at least in part on first header field value information obtained from the first packet and/or second header field value information obtained from the second packet; re-valuing one or more header field values in a subsequent received packet based on the header field re-valuing information, either prior to the subsequent packet being input to the transport protocol third socket or the transport protocol fourth socket or subsequent to the subsequent packet being output from the transport protocol third socket or the transport protocol fourth socket.

Further features and advantages will become apparent from the following description of embodiments, given by way of example only, which is made with reference to the accompanying drawings.

BRIEF DESCRIPTION OF THE DRAWINGS

Several parts and components of the embodiments appear in more than one Figure; for the sake of clarity the same reference numeral will be used to refer to the same part and component in all of the Figures.

DETAILED DESCRIPTION OF CERTAIN INVENTIVE EMBODIMENTS

Figure 1:
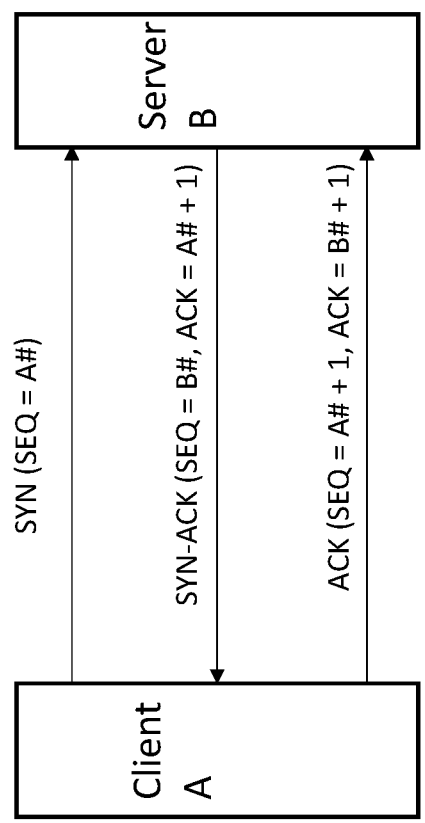
FIG. 1 illustrates the TCP connection set up three way handshake and is prior art.
Figure 2:
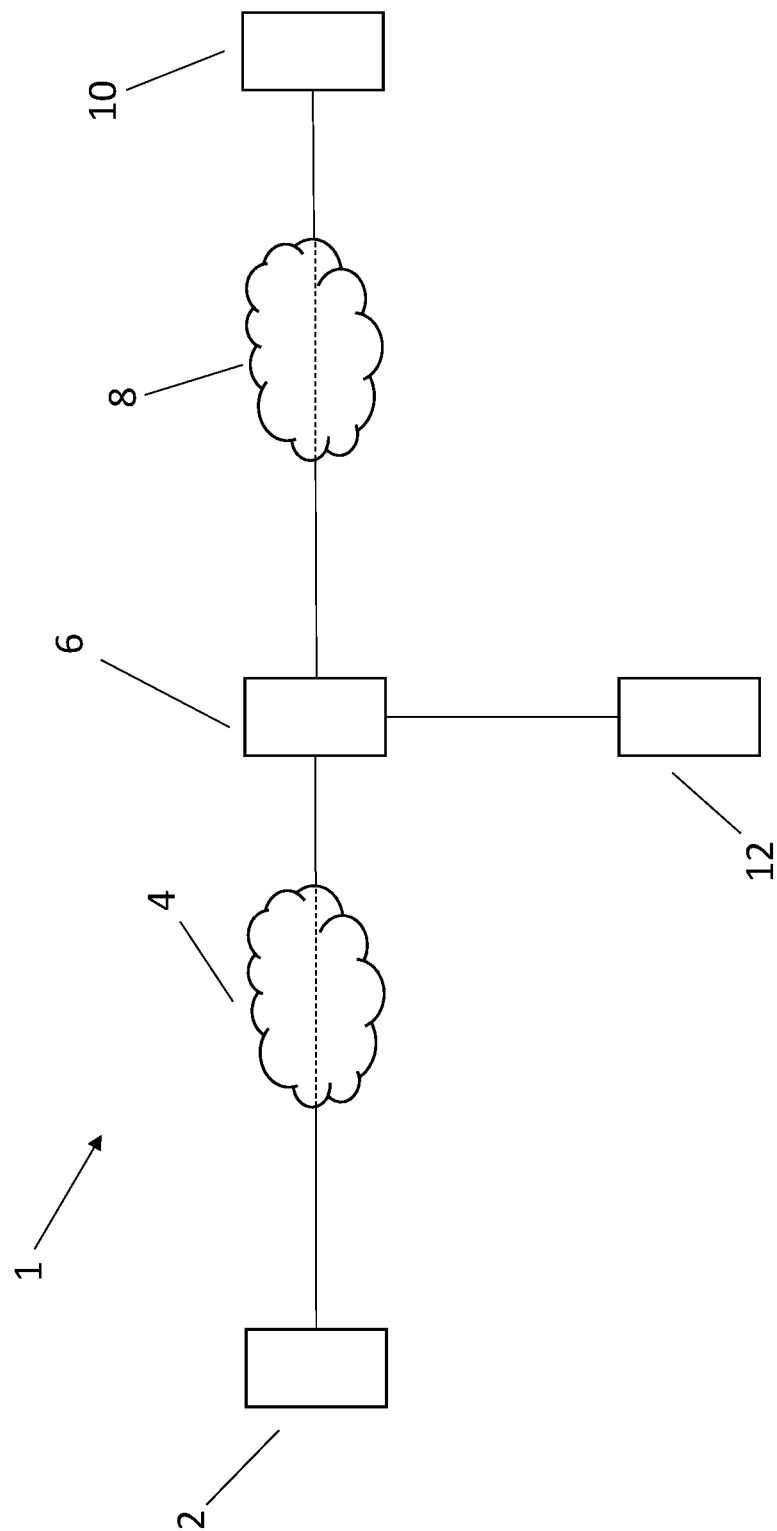
FIG. 2 is a schematic diagram of a communications network.

A communications network 1 in which embodiments may be practiced is shown in FIG. 2. The network 1 contains a client device 2, which is connectable, via a first network 4, to a first network node 6. The first network node 6 in turn is connectable, via a second network 8, to a remote server 10 and is also connectable to a second network node 12.

In a typical scenario the client device 2 may be user equipment such as a computer, tablet, internet capable mobile telephone (i.e. smartphone) or the like. The network 4 is an access network for the internet, for example, a cellular (e.g. 3G or LTE mobile) network, or a PTSN or Cable network connecting the device 2 to an internet service provider (ISP). Accordingly, a connection between the communications device 2 and the first network node 6 may have both wired and wireless elements, including 3G/LTE as mentioned and/or 802.11 (Wi-Fi). The client device 2 is an example of a first entity in the communications network 1.

In this example, the first network node 6 is arranged to intercept messages sent from the client device 2 to the server 10 and vice versa. To enable this, the first network node 6 may be provided as a part of an access network, i.e. as part of first network 4. As such, the first network node 6 may be provided within or alongside an internet gateway element in the first network 4. The first network node 6 is an example of a third entity in the communications network 1.

The second network 8 may be a wide area network, such as the internet, through which messages may be sent to the server 10. The remote server 10 in turn is capable of receiving messages from devices such as the client device 2, and sending responses. In particular examples, the client device 2 sends Layer 7 protocol (e.g. HTTP) requests to the server 10 over a TCP/IP connection and the server 10 responds to the requests by sending Layer 7 protocol responses to the client device 2 over the TCP/IP connection. As such, the remote server 10 may, for example, be a webpage server serving web pages to the client device 2 or a media server serving media files, for example video or audio files to the client device 2. The remote server 10 is an example of a second entity in the communications network 1.

The first network node 6 is arranged to inspect request messages that are sent from the client device 2 to the remote server 10 and response messages that are sent from the remote server 10 to the client device 2 to determine whether or not to forward the messages to the second network node 12 for the second network node to process them. The first network node 6, for example, may inspect the messages and determine whether or not to send them to the second network node 12 based on a policy set (i.e. a rule set) for a subscriber account linked to the client device 2.

In one example, the second network node 12 comprises a proxy server, for example a HTTP proxy server that modifies HTTP requests and/or HTTP responses between the client device 2 and the remote server 10 in order to provide additional services to those requests and/or responses. For example, the second network node 12 may perform media optimization, for example, video compression, on a video stream that is being transmitted in one or more HTTP response messages from the remote server 10 to the client device 2. The second network node 12 is an example of a fourth entity in the communications network 1.

Figure 3:
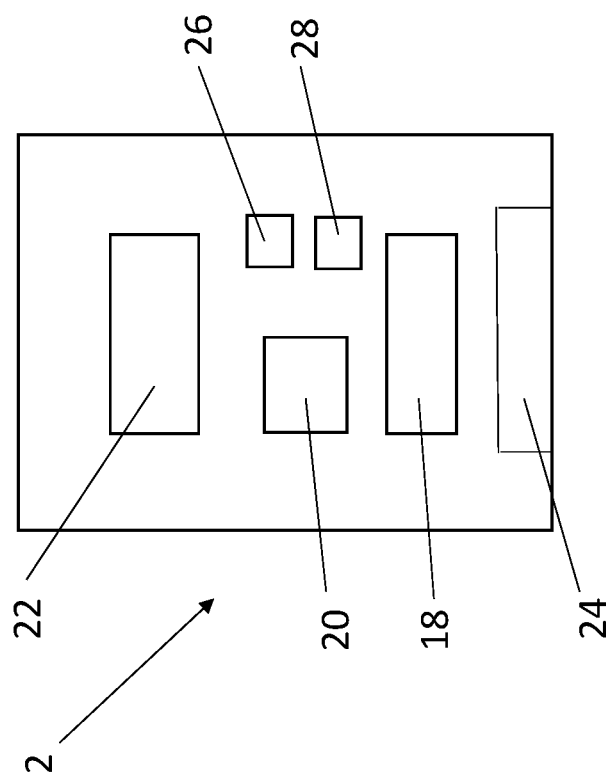
FIG. 3 shows a schematic diagram of the client device shown in FIG. 1.

FIG. 3 show more detail of the components of the client device 2. In FIG. 3, the client device 2 is provided with a processing system 18 and a memory 20. An interface 24 connects the device 2 to the first network 4 described above. The processing system 18 may contain a CPU, cache memory, bus and the like as are known in the art. The memory 20 may be volatile or non-volatile, such as a hard drive, flash memory, RAM or similar. The client device 2 further comprise an operating system 26 for managing the processing system 18, memory 20 and the interface 24. The interface 24 may operate according to a number of known standards, and may be configured appropriately. For example the interface 24 may be a cellular, i.e. 3G or LTE standard wireless interface, a 802.11 (Wi-Fi) interface, Ethernet, or any other suitable type. Although not shown, the client device 2 may also comprise, or be connected to, any number of human interface elements, such as display and audio systems, as well as user input devices such as a touchscreen, buttons, keyboard, microphone and the like.

The memory 20 stores applications 22 containing computer instructions which may be executed by the processing system 18 as is known in the art. In accordance with the computer instructions of the applications 22, the processing system 18 sends messages via the interface 24 to servers such as the server 10. Equally the processing system 18 may receive messages via the interface 24, and process the data contained within. The memory 20 may store a plurality of applications, each able to cause messages to be sent and received via the interface 24.

As an example, one of the applications may be a web browser application. The web browser application causes the processing system 18 to display a web browser user interface (not shown) to a user. Using the user interface the user may browse to or otherwise select a desired website. The processing system 18 may then cause the interface 24 to send an HTTP request message to the server hosting the desired website. The subsequent HTTP response may be received by the interface 24 and interpreted by the processing system 18 under control of the browser application 22 to display the requested webpage on a screen of the client device 2. This process may be repeated with, for example, the user clicking a link, and the processing system 18 requesting a further webpage from the server. The user may, for example, click on a link to select to play a video file in the browser and the processing system 18 requests the video file from the server 10.

The messages may be sent to and received from the server 10 in packets over a TCP connection. To that end, the operating system 26 manages the TCP connection and establishes a client TCP socket 28 as an end point to that connection for sending and receiving the TCP packets.

Each of the messages sent under the control of an application will be sent via the interface 24 to the server 10, and will be intercepted by the first network node 6. Likewise, in some embodiments, each response message sent back from the server 10 to the device 2 will be intercepted by the first network node 6.

Figure 4:
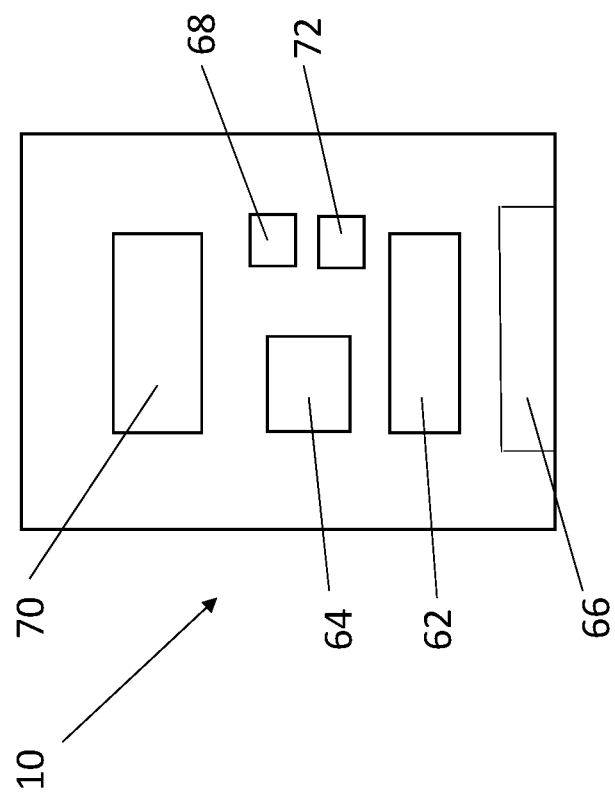
FIG. 4 shows a schematic diagram of the remote server shown in FIG. 1.

FIG. 4 shows the remote server 10. The remote server 10 comprises a processing system 62 and a memory 64. The memory 64 contains computer readable instructions which are executed by the processing system 62. The remote server 10 further comprises an interface 66, which connects the remote server 10 to the second network 8. The remote server 10 further comprise an operating system 68 for managing the processing system 62, memory 64 and the interface 66.

The memory 64 stores applications 70 containing computer instructions which may be executed by the processing system 62 as is known in the art. In accordance with the computer instructions of the applications 70, the processing system 62 receives messages via the interface 66 from client devices such as the client device 2. Equally the processing system 62 may send messages via the interface 66 to client devices such as the client device 2.

As an example, one of the applications 68 may be a resource server application, for example, a video server application, that in response to request messages received from a client device such as the client device 2, sends a response message comprising the requested resource to the client device 2. For example, the processing system 62 may receive HTTP request messages from the client device 2 and then cause the interface 66 to send HTTP response messages including the requested resource to the client device 2.

The messages may be sent to and received from the client device 2 in packets over a TCP connection. To that end, the operating system 68 manages the TCP connection and establishes a server TCP socket 72 as an end point to that connection for sending and receiving TCP packets.

Figure 5:
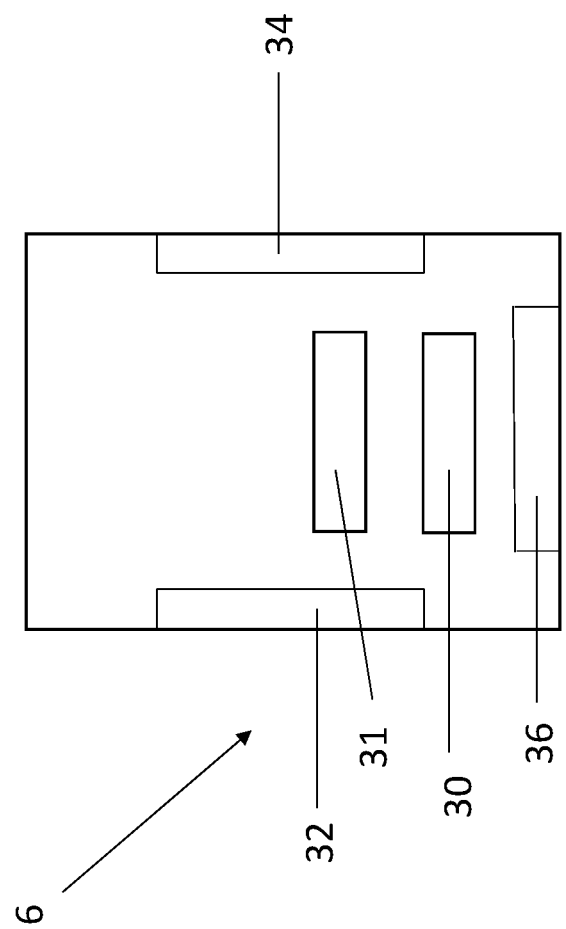
FIG. 5 shows a schematic diagram of the first network node shown in FIG. 1.

FIG. 5 shows the first network node 6. The first network node 6 comprises a processing system 30 and a memory 31. The memory 31 contains computer readable instructions which are executed by the processing system 30, as will be described in more detail later. The first network node 6 further comprises a first interface 32, which can connect the first network node 6 to the client device 2, a second interface 34, which can connect the first network node 6 to the server 10 and a third interface 36, which can connect the first network node 6 to the second network node 12.

Figure 6:
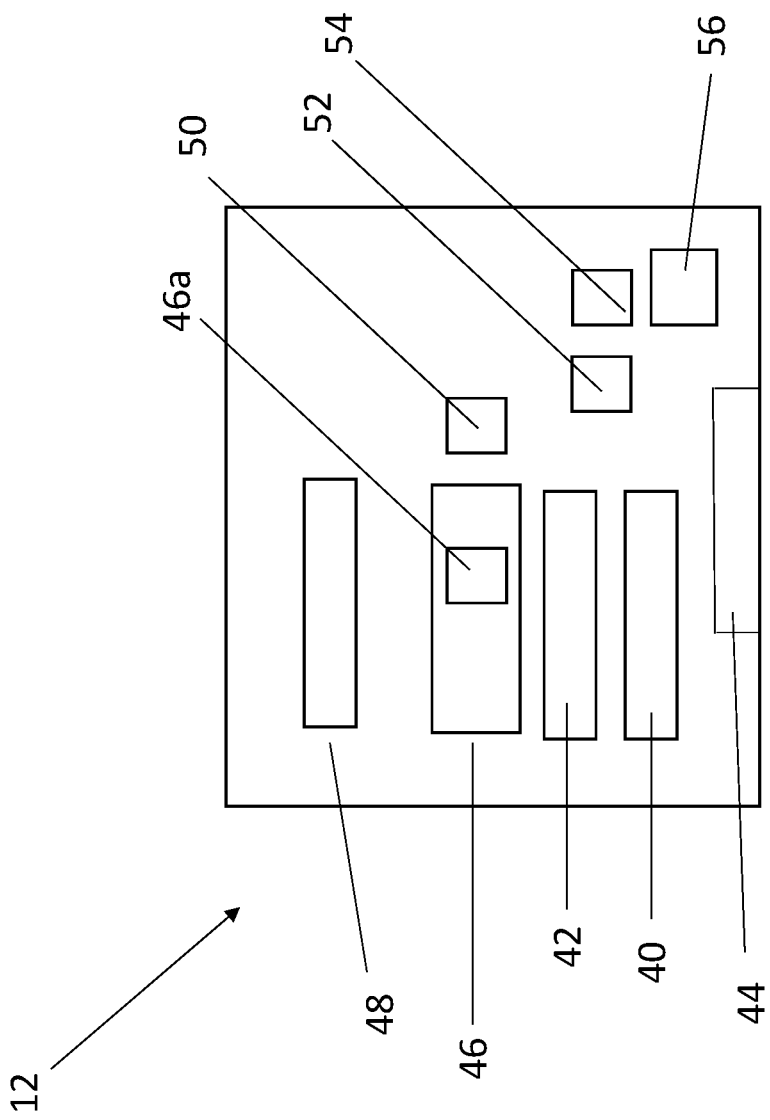
FIG. 6 shows a schematic diagram of the second network node shown in FIG. 1.

FIG. 6 shows the second network node 12. The second network node 12 comprises a processing system 40 and a memory 42. The memory contains computer readable instructions which are executed by the processing system 40, as will be described in more detail later. The second network node 12 further comprises a first interface 44, which can connect the second network node 12 to the first network node 6.

The second network node 12 further comprise an operating system 46 for managing the processing system 40, memory 42 and the first interface 44. The second network node 12 further comprises a proxy server 48, for example a HTTP proxy server, that runs on the processing system 40 with the support of the operating system 46 and which implements one or more application (e.g. Layer 7) processes that perform services on messages that are received and/or transmitted over the first network interface 44.

The operating system 46 comprises a packet filtering module 46a that provides functionality for packet filtering, Network Address Translation (NAT), packet mangling and routing of packets that make up the messages that are received and/or transmitted over the first network interface 44.

In one example, the operating system 46 is a Linux operating system and the packet filtering module 46a is Linux Netfilter. As is well known, Netfilter enables, by means of the iptables user-space command, packet processing rules to be configured in a series known as a chain. A set of chains makes up a table. As a packet moves through the networking subsystem of the Linux operating system 46, Netfilter 46 applies the rules in certain chains to the packets.

The second network node 12 further comprises a TCP socket configuration and re-mapping module 50. The module 50 is for configuring a Proxy TCP client side socket 52 and a Proxy TCP server side socket 54 provided by the operating system 46 for the HTTP proxy server 48 at the second network node 12. When configured, the Proxy client side TCP socket 52 and the Proxy server side TCP socket are part of a split TCP connection between the client device 2 and the remote server 10. One end point in this split TCP connection is the TCP client socket 28 at the client 2 that is set up as an end point in an end-to-end TCP connection to the remote server 10. The other end point in the split TCP connection is the TCP server socket 72 at the server 10 that is also set up as end point in the end-to-end TCP connection between the client device 2 and the server 10. Each TCP socket in the split connection is defined by an associated port number and IP address.

When the Proxy TCP client side socket 52 and the Proxy TCP server side socket 54 are set up, the Proxy TCP client side socket 52 receives packets that have been transmitted from the TCP client socket 28 at the client 2 and passes the payload of those packets to the proxy server 48. One or more of the applications implemented by the proxy server 48 may then perform a service on the payload. The Proxy TCP server side socket 54 then receives the payload back from the proxy server 48 and sends a packet containing the payload to the TCP server socket 70 at the server 10.

Similarly, the Proxy TCP server side socket 54 receives packets that have been transmitted from the TCP server socket 70 at the server 10 and passes the payload of the packets to the proxy server 48. One or more of the application processes implemented by the proxy server 48 may then perform a service on the payload.

The Proxy TCP client side socket 52 then receives the payload back from the proxy server 48 and sends a packet containing the payload to the TCP client socket 28 at the client device 2.

The second node 12 may further comprise a cache 56 for storing media content. In some examples, if the client device 2 requests content from the remote server 12 and that content is already stored in the cache 56, the content is delivered to the client device 2 from the cache 56.

In one example, as will be described in more detail below, in order to establish the Proxy TCP client side socket 52 and the Proxy TCP server side socket 54, the module 50 makes use of copies of the SYN and SYNACK packets that have been previously sent between the client device 2 and the server 10 as part of a TCP handshake to establish the end-to-end TCP connection between the two.

In this example, the first network node 6 stores a copy of each of these SYN and SYNACK packets when the end-to-end TCP connection between the client 2 and server 10 is being established and then send copies of these packets to the second network node 12 where they are intercepted by the module 50.

The module 50 uses the SYN and SYNACK packets to establish the Proxy client side socket 52 and the Proxy server side socket 54. As will be explained in more detail below, the module 50 injects the SYN packet into the Proxy client side socket 52, receives from the Proxy client side socket 52 a Proxy SYNACK packet and in response to that and generates an injects an ACK packet into the Proxy client side socket 52. This in effect, is a 3-way handshake between the module 50 and the Proxy client side socket 52 that establishes the Proxy client side socket 52. Furthermore, the module 50 receives a Proxy SYN packet sent by the Proxy server side socket 54, and in response to this modifies the SYNACK packet so that it comprises an acknowledgment number that is consistent with the Proxy SYN packet and injects the modified SYNACK packet into Proxy server side socket 54 and receives from the Proxy server side socket 54 an ACK packet. This, in effect is a 3-way handshake between the module 50 and the Proxy server side socket 54 that establishes the Proxy server side socket 54.

The module 50 maintains a connection table containing re-valuing information, based on information obtained from the SYN, SYNACK, PROXY SYN and Proxy SYNACK packets that it uses to: re-value the value in the acknowledgment number field of the header of each TCP packet sent by the client socket 28 at the client device 2, and received by the module 50, to a value that is correct for the Proxy client side socket 52; re-value the value in acknowledgment number field of the header of each TCP packet sent by the server socket 28 at the server 10, and received by the module 50, to a value that is correct for the Proxy server side socket 54; re-value the value in the sequence number field of the header of each TCP packet sent by the Proxy client side socket 52, and received by the module 50, to a value that is correct for the client socket 28 at the client device 2; re-value the value in the sequence number field of the header of each TCP packet sent by the Proxy server side socket 54, and received by the module 50, to a value that is correct for the server socket 28 at the server 10.

Figure 7:
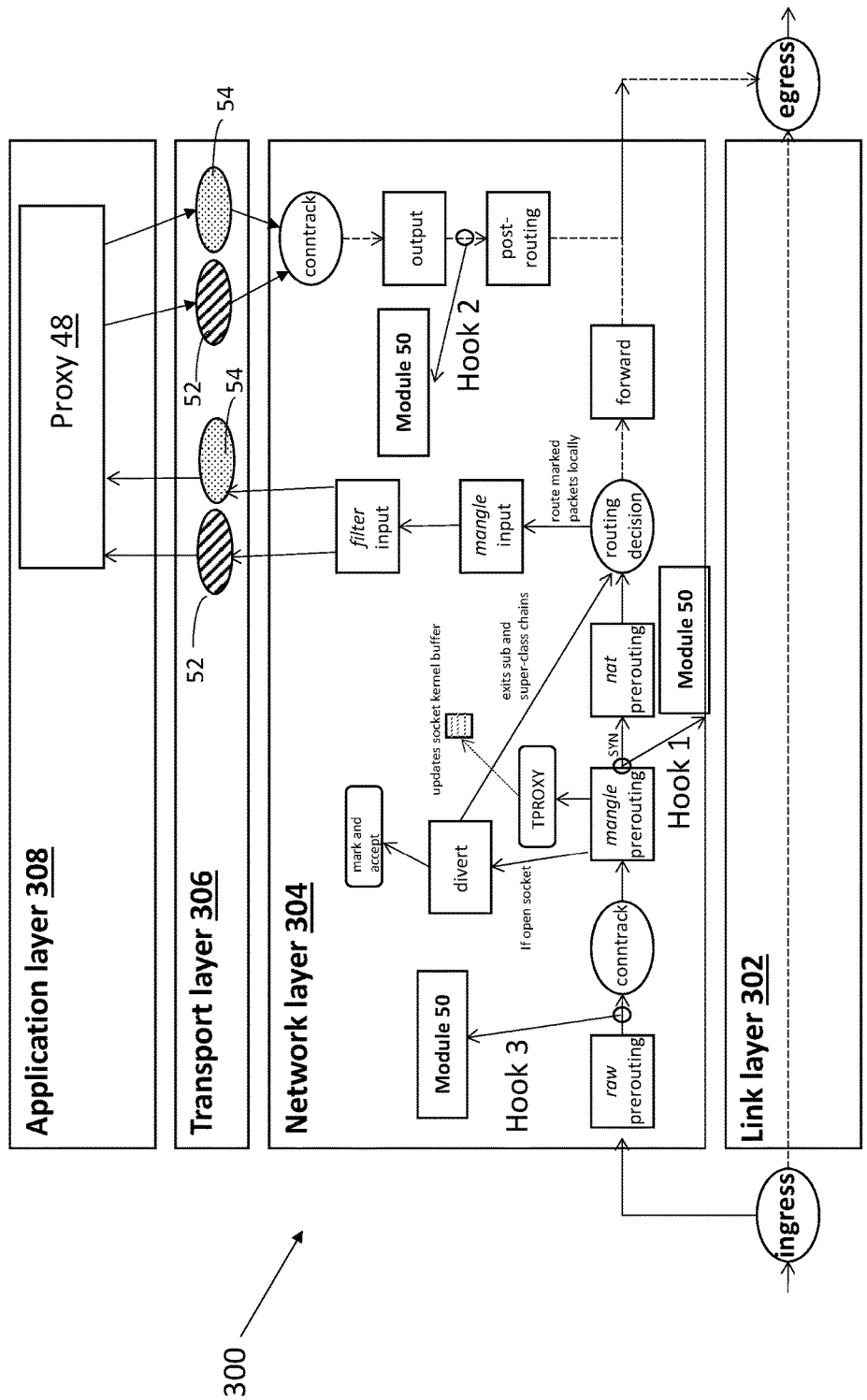
FIG. 7 shows a schematic diagram of a network stack at the second network node.

Referring now to FIG. 7, there is illustrated a Network stack 300 at the second network node 12. The stack 300 includes the Link layer 302, the Network Layer 304, the Transport layer 306 and the Application layer 308.

FIG. 7 also illustrates an arrangement of Netfilter components and the Module 50 in the Network layer 304, the Proxy TCP client side socket 52 (illustrated as two ovals each shaded with sloping straight lines) and the Proxy TCP server side socket 54 (illustrated as two ovals each shaded with dots) both in the Transport layer 306 and the Proxy server 48 in the Application layer 308. The Link layer 302 plays no role in this example and will not be discussed further.

As is known in the art, Netfilter consists of four tables: Filter, Nat, Mangle and Raw. Each table has a number of possible chains, namely: PREROUTING, INPUT, FORWARD, OUTPUT and POSTROUTING and each chain may comprises a number of rules. Rules in the various tables are, typically, used as follows:

Filter—Packet filtering (rejecting, dropping or accepting packets);

Nat—Network Address Translation (NAT) including Destination NAT, Source NAT;

Mangle—General packet header modification such as setting the TOS value or marking packets for policy routing.

Raw—Used primarily for creating exemptions from connection tracking with the NOTRACK target. Also used for stateless Destination NAT.

FIG. 7 illustrates, using a first oval box labelled 'ingress' an ingress point where each packet received from the first network node 6 via the interface 44 (see FIG. 6) enters the stack 300 and illustrates using a second oval box labelled 'egress' a egress point where each packet leaves the stack 300 and is then sent to the first network node 6 via the interface 44.

FIG. 7 illustrates using labelled rectangular boxes, each Netfilter chain (PREROUTING, INPUT, FORWARD, OUTPUT or POSTROUTING) and each Netfilter table (raw, mangle, nat, filter) that a chain exists in, and uses arrows to indicate the order that a packet may traverse the chains/tables.

FIG. 7 illustrates, using two oval boxes labelled 'conntrack', the position in the sequence of chains/tables of Netfilter's conntrack which provides connection tracking functionality, and, in an oval box labelled 'routing decision' routing functionality which routes, for example, packets that have been marked for local routing to the Proxy 48 into the INPUT chain and routes packets that have not been marked for local routing into the FORWARD chain.

FIG. 7 illustrates in a box labelled 'TPROXY' an iptables rule used in the PREROUTING chain in the mangle table to mark packets that are required to be re-directed to the Proxy server 48. When a packet marked in accordance with the rule reaches the 'routing decision' functionality, that functionality routes the packet into the INPUT chain (as opposed to the FORWARD chain) and from there it passes into the Transport layer 306.

An example rule is:
iptables -t mangle -A PREROUTING -p tcp --dport 80 -j TPROXY --tproxy-mark 0x1/0x1 --on-port 3128
which would result in a packet having a destination port 80 (i.e. the port conventionally used for HTTP traffic) in the TCP header being marked for local routing. Other similar rules could be used to direct packets having a destination port 443 (i.e. the port conventionally used for HTTPS traffic) to the proxy server 48 or to direct packets having a destination port between 1 and 65535 (i.e. any TCP traffic) to the proxy server 48.

It will be appreciated that, in this example, only the original SYN packet from the client device 2 need invoke the 'TPROXY' iptables rule. Once the rule has been invoked for the SYN packet, netfilter records that subsequent packets in a data flow from the client device 2 to the server 10 having the same 5-tuple information (i.e. source IP address of the client device, source port of the client device, destination IP address of the server 10, destination port 80 of the server 10, transport protocol (TCP)) as the SYN packet are to be marked for local routing to the Proxy 48 and diverted directly to the routing decision by-passing the TPROXY rule and the nat pre-routing table so as to avoid unnecessarily invoking 'TPROXY' iptables rule. As is standard, the TPROXY rule further populates a socket entry in the socket kernel buffer in respect of the SYN packet, otherwise, as the destination IP address of the packet is that of the remote server 10 and not that of the Proxy 48, the Transport layer 306 would reject the packet. Similarly, netfilter records that subsequent packets in the data flow from the remote server 10 to the client device 2 and having the same 5-tuple information (i.e. source IP address of the server 10, source port 80 of the server 10, destination IP address of the client device 2, destination port of the client device 2, transport protocol (TCP)) are to be routed to the Proxy 48.

In effect, netfilter represents a set of hooks (i.e. points) inside the Linux kernel that allows specific kernel modules to register callback functions with the network stack in order to monitor and optionally process packets traversing that network stack 300.

To that end, in this example, the module 50 is a netfilter kernel module that when loaded registers respective callback functions at first (Hook 1), second (Hook 2) and third (Hook 3) hooks within the netfilter chains in the Network layer 304 as illustrated in FIG. 7.

The first hook (Hook 1) is in the PREROUTING chain after the mangle table and before the nat table. The first hook (Hook 1) is active during a Proxy client side socket 52 and Proxy server side socket 54 set up phase in which the module 50 participates in establishing the Proxy client side socket 52 and the Proxy server side socket 54. To that end, the first hook (HOOK 1) is positioned after the TPROXY target and before the nat table so that correct socket information and non-network translated addresses are available in packets used by the TCP socket configuration and re-mapping module 50 to establish the proxy client side socket 52 and the proxy server side socket 54.

The second hook (HOOK 2) is in the POSTROUTING chain before the nat table (for clarity not shown in FIG. 7). The second hook (HOOK 2) is active during the client side socket and server side socket set up phase and, furthermore, is also active in a subsequent data phase in which the established proxy client side socket 52 is used for communicating packets to and from the client device 2 and the established proxy server side socket 54 is used for communicating packets to and from the server. The second hook is positioned before the NAT table so as so avoid any possible post routing NAT. The second hook is positioned in the POSTROUTING chain so that in the data phase the TCP socket configuration and re-mapping module 50 can re-sequence the sequence numbers and/or acknowledgment numbers of data packets that exit the proxy server 48 back to the numbers expected at the client 2 and the server 10.

The third hook (HOOK 3) is in the PREROUTING chain after the raw table and before conntrack. As will be described in more detail below, the third hook is active during the data phase so that the TCP socket configuration and re-mapping module 50 can re-write the sequence numbers and/or acknowledgment numbers of data packets that are for the proxy client side socket 52 or for the proxy server side socket 54 to the required numbers for those sockets.

It will be appreciated that if, as in this example, the third hook (HOOK 3) is before conntrack in the PREROUTING chain, then the second hook must be after conntrack in the OUTPUT/POSTROUTING chain so that conntrack sees only the sequence numbers appropriate for the proxy client side socket 52 and the proxy server side socket 54 and not a mixture of those sequence numbers and the sequence numbers of the actual client device 2 and server 10 TCP connection. Seeing such a mixture of sequence numbers could cause conntrack to drop packets due to unexpected (i.e. out of sequence) sequence numbers.

Alternatively, the third hook could be placed after conntrack in the PREROUTING chain and the second hook before conntrack in the OUTPUT/POSTROUTING chain so that conntrack sees only the sequence numbers appropriate for the proxy client side socket 52 and the proxy server side socket 54.

It will be appreciated that in some examples, including the one described below, the nat tables are empty (i.e. no network address translation is performed).

Figure 8A:
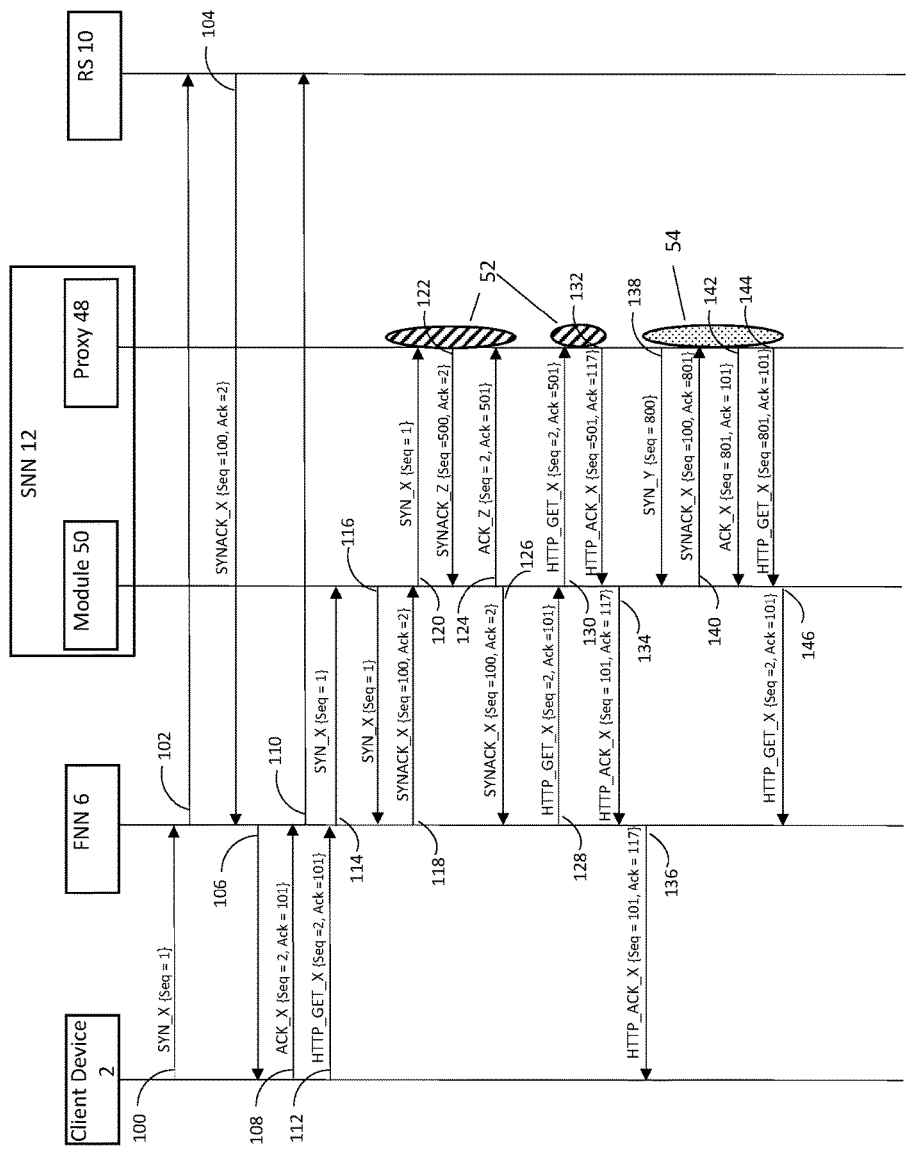
FIGS. 8a, 8b, and 8c shows communications flows according to an embodiment.
Figure 8B:
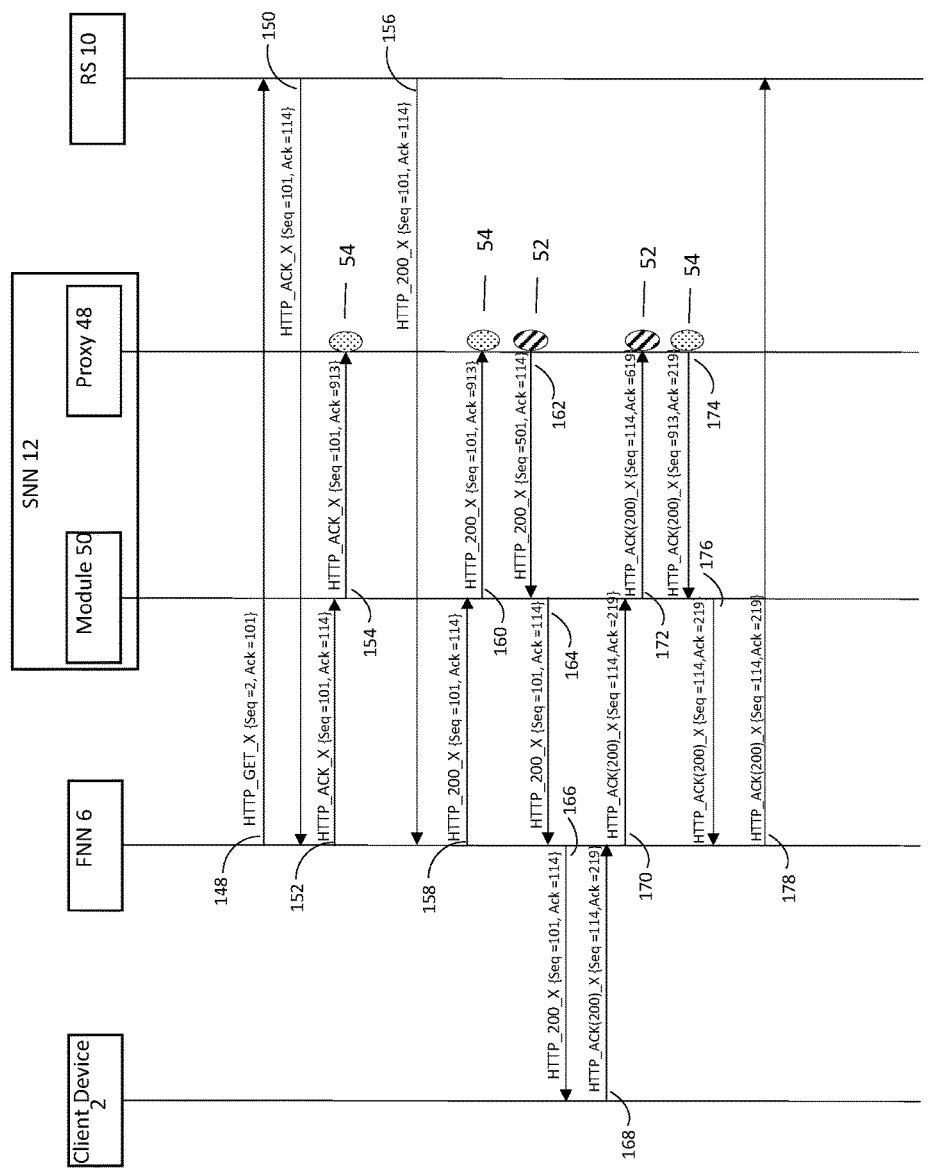
Figure 8C:
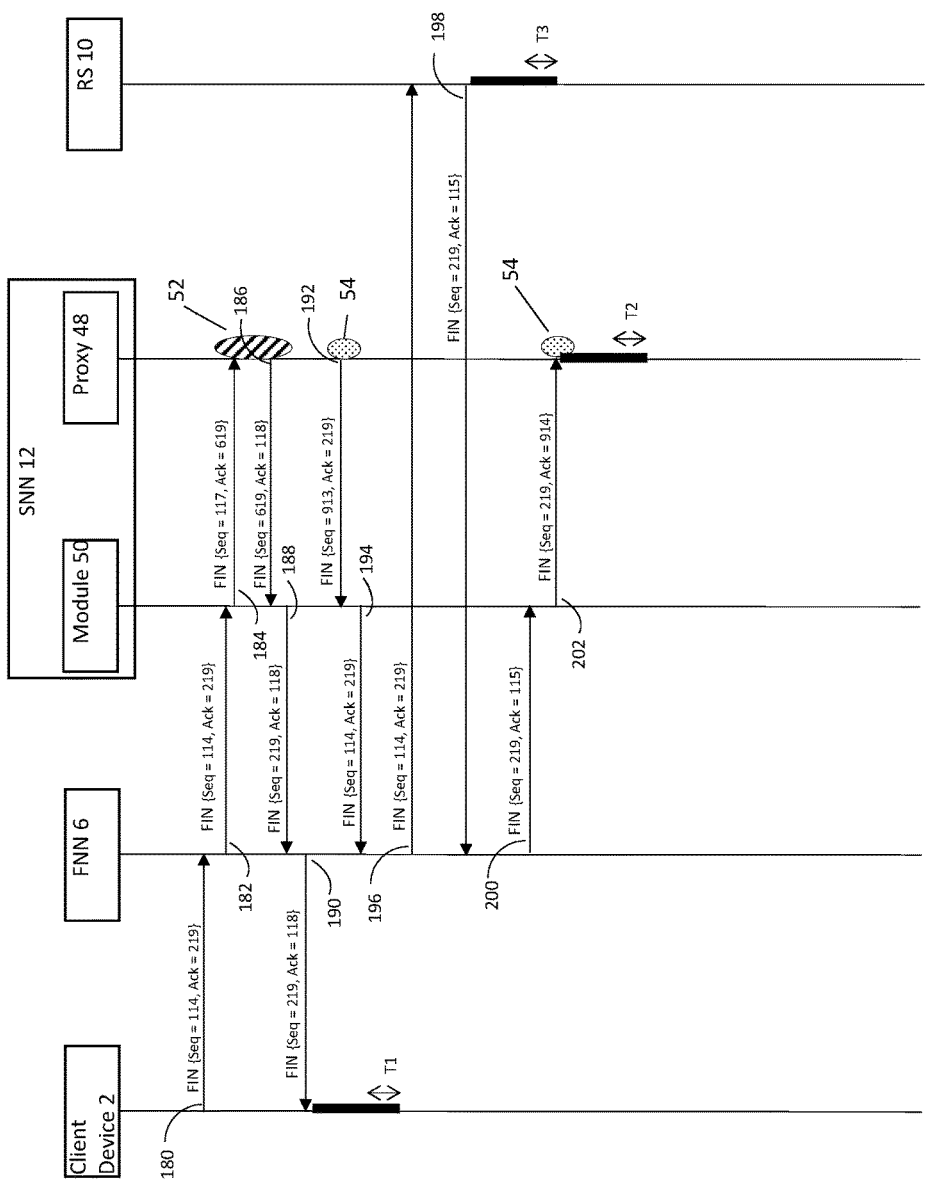

Methods according to embodiments will now be described with reference to FIG. 8 (Parts 1, 2 and 3) which shows packet flows between the client device 2, the first network node 6, the remote server 10, and the module 50 and the Proxy 48 at the second network Node 12. In FIG. 8, a TCP sequence number for a given packet (i.e. the value of the Sequence number field in the TCP header) is indicated as 'Seq' and a TCP acknowledgment number (i.e. the value of the Acknowledgement number field in the TCP header) for a given packet is indicated as 'Pick'.

Referring first to FIG. 8 (part 1), in step 100, the client device 2 initiates a 3-way TCP handshake with the remote server 10 by sending a SYN packet (SYN_X {Seq=1}) to the remote server 10. The client device 2 may, for example, initiate the 3-way TCP handshake to establish the TCP connection to enable an application at the client device 2 to then send a HTTP request over the TCP connection.

The first network node 6 intercepts the SYN packet (SYN_X {Seq=1}) and creates and stores a copy of it and, in step 102, sends the original SYN packet (SYN_X {Seq=1}) on to the remote server 10 (or it may store the original and send a copy to the remote server).

The remote server 10 receives the SYN packet (SYN_X {Seq=1}) and responds, in step 104, by sending a SYNACK packet (SYNACK_X {Seq=100, Ack=2}) back to the client device 2. The first network node 6 intercepts the SYNACK packet (SYNACK_X {Seq=100, Ack=2}) and creates and stores a copy of it and, in step 106, sends the original SYNACK packet (SYNACK_X {Seq=100, Ack=2}) on to the client device 2 (or it may store the original and send a copy to the client device 2).

The client device 2 receives the SYNACK packet (SYNACK_X {Seq=100, Ack=2}) and responds, in step 108, by sending an ACK packet (ACK_X {Seq=2, Ack=101}) to the remote server 10. The first network node 6 intercepts the ACK packet (ACK_X {Seq=2, Ack=101}) and, in step 110, forwards it to the remote server 10. The remote server 10 receives the ACK packet (ACK_X {Seq=2, Ack=101}) and, at this point, the 3-way handshake is complete and the TCP connection between the client device 2 and the remote server 10 is established. The end points in this connection are the client socket 28 at the client device 2 and the server socket 72 at the remote server 10.

The client device 2 sends, in step 112, a packet (HTTP_GET_X {Seq=2, Ack=101} conveying a HTTP GET request to the remote server 10. In this example, the first network node 6 is configured to divert all HTTP traffic between the client device 2 and the remote server 10 via the HTTP proxy 48 at the second network node 12. Accordingly, the first network node 6 intercepts the packet (HTTP_GET_X {Seq=2, Ack=101}, identifies that it is conveying a HTTP GET request and so should be diverted to the second network node 12 and so, in step 114, sends the copy of the SYN packet (SYN_X {Seq=1}) to the second network node 12 to be used to establish the proxy client side socket 52. The copy of the SYN packet (SYN_X {Seq=1}) is received at the second network node 12 and passes through the PREROUTING chain (See FIG. 5) until it is received by the module 50 at the first hook.

The module 50 stores a copy of the SYN packet (SYN_X {Seq=1}) and, in step 116, also sends a copy of the SYN packet (SYN_X {Seq=1}) back to the first network node 6.

The first network node 6 receives the copy of the SYN packet (SYN_X {Seq=1}) and, in response, at step 118 sends the copy of the SYNACK packet (SYNACK_X {Seq=100, Ack=2}) to the second network node 112 to be used to establish the proxy server side socket 54. The copy of the SYNACK packet (SYNACK_X {Seq=100, Ack=2}) is received at the second network node 12 and passes through the PREROUTING chain (See FIG. 5) until it is received by the Module 50 at the first hook. The module 50 stores a copy of the SYNACK packet (SYNACK_X {Seq=100, Ack=2}) in memory.

Next, at step 120, the module 50 'injects' a copy of the SYN packet (SYN_X {Seq=1}), into the proxy client side socket 52. In the context of this application, 'injecting' means that the module 50 re-inputs the copy of the SYN packet (SYN_X {Seq=1}) into the Network layer 304 at the start of the PREROUTING chain (see FIG. 7) from where the copy of the SYN packet (SYN_X {Seq=1}) is routed up to the Transport layer 306. This is required so that a copy of the SYN packet (SYN_X {Seq=1}) again passes through Conntrack ensuring that the delay period during which the copy of the SYN packet (SYN_X {Seq=1}) has been stored by the module 50 does not have adverse effects on Conntrack. The Transport Layer 46 (see FIG. 7) receives the copy of the SYN packet (SYN_X {Seq=1}) at a 'listening' port, for example, port 3128 for the Proxy 48, and in response opens up the proxy client side port 52, which the copy of the SYN packet (SYN_X {Seq=1}) is passed to, as a TCP end point for the connection to the client device 2.

In response to receiving the copy of SYN packet (SYN_X {Seq=1}), a client side socket SYNACK packet (SYNACK_Z {Seq=500, Ack=2}) is output from the proxy client side socket 52, step 122, and is processed through the OUTPUT chain (See FIG. 5) and is received by the module 50 at the third hook.

In response to receiving the client side socket SYNACK packet (SYNACK_Z {Seq=500, Ack=2}), the module 50 injects an ACK packet (ACK_Z {Seq=2, Ack=501}) into the client side socket, step 124. This completes a TCP three way handshake for the proxy client side socket 52 which is now established.

The module 50 determines a first delta (or difference) between the sequence number of the copy of the SYNACK packet (SYNACK_X {Seq=100, Ack=2}) from the remote server 10 and the sequence number of the client side socket SYNACK packet (SYNACK_Z {Seq=500, Ack=2}). The module 50 stores the first delta (400 in this example) in an entry in a connection table established for the connection between the client device 2 and the remote server 10. It will be appreciated that the entry is identified or indexed using the appropriate 5 tuple (IP address and port of the client device 2, IP address and port of the server 10 and protocol) obtained from the copy of the SYN packet (SYN_X {Seq=1}) and/or the copy of the SYNACK packet (SYN- ACK_X {Seq=100, Ack=2}). Subsequently, the module 50 uses the first delta to offset the acknowledgment numbers of packets input to the proxy client side socket 52 and to offset the sequence numbers of packets output from proxy client side socket 52.

The module 50 may open the entry in its connection table after it receives the copy of SYN packet (SYN_X {Seq=1}). Although in this example, for simplicity, only one connection in respect of the client device 2 and server 10 is described, it will be appreciated that there may be many concurrent connections involving multiple client devices and servers and that the second network node 12 has a separate client side socket and server socket for the Proxy server 48 for each such connection. In one example, the module 50 stores each connection entry as a connection object in a hash table of list heads implemented using Linux RCU locking.

Next, the module 50 modifies the sequence number of the client side socket SYNACK packet (SYNACK_Z {Seq=500, Ack=2}) so that it is the same as that of the copy of the SYNACK packet (SYNACK_X {Seq=100, Ack=2}) (i.e. it offsets the sequence number by 400) and, at step 126, send this further copy of the SYNACK packet (SYNACK_X {Seq=100, Ack=2}) back to the first network node 6.

In response to receiving the further copy of the SYNACK packet (SYNACK_X {Seq=100, Ack=2}), now that the proxy client side socket 52 is established, the first network node 6 sends, step 128, the packet (HTTP_GET_X {Seq=2, Ack=101}) conveying the HTTP GET request to the second network node 12. The packet (HTTP_GET_X {Seq=2, Ack=101}) is processed through the PREROUTING chain and it is received by the Module 50 at the third hook (See FIG. 5). The module 50 modifies the packet (HTTP_GET_X {Seq=2, Ack=101} to generate a modified packet (HTTP_GET_X {Seq=2, Ack=501} conveying the HTTP GET request and comprising the expected Sequence and Ack numbers for the Proxy client side socket 52.

At step 130, the Module 50 sends the modified packet (HTTP_GET_X {Seq=2, Ack=501} onwards through the PREROUTING chain and the INPUT chain to proxy client side socket 52 in the Transport Layer. From the Transport Layer, the payload of the packet is propagated by the proxy client side socket 52 to the proxy server 48 for processing by one or more of the applications implemented by the proxy server 48.

Furthermore, in accordance with the TCP, the proxy client side server socket 52 sends, step 132, an ACK packet (HTTP_ACK_X {Seq=501, Ack=117}) to acknowledge receipt of the modified packet (HTTP_GET_X {Seq=2, Ack=501}).

As is standard in the TCP, the Ack number in the Ack packet (HTTP_ACK_X {Seq=501, Ack=117}) is the sum of the Sequence number in the packet (HTTP_GET_X {Seq=2, Ack 501}) and the length of the HTTP payload in the packet (HTTP_GET_X {Seq=2, Ack 501}). In this example, the Sequence number in the packet (HTTP_GET_X {Seq=2, Ack 501}) is 2 and the HTTP payload length is 115 bytes giving a sequence number in the Ack packet (HTTP_ACK_X {Seq=501, Ack=117}) of 117.

The ACK packet (HTTP_ACK_X {Seq=501, Ack=117} is processed through the OUTPUT chain and is received by the Module 50 at the second hook. The Module 50 modifies the ACK packet (HTTP_ACK_X {Seq=501, Ack=117} to generate a modified ACK packet (HTTP_ACK_X {Seq=101, Ack=117} comprising the expected sequence and Ack numbers for the client side device 2.

At step 134, the Module 50 passes the modified ACK packet (HTTP_ACK_X {Seq=101, Ack=117} onwards through the POSTROUTING chain to the first network node 6. At step 136, the first network node 6 sends the modified ACK packet (HTTP_ACK_X {Seq=101, Ack=117} to the client device 2.

The operating system opens the proxy server side socket 54 for the Proxy 48, and, at step 138, the proxy server side socket 54 sends a SYN packet (SYN_Y {Seq=800}) which passes through the OUTPUT chain and is received by the Module 50 at the second hook.

The module 50 determines a second delta (or difference) between the Sequence number of the SYN packet (SYN_Y {Seq=800}) from the proxy server side socket 54 and the sequence number of the copy of SYN packet (SYN_X {Seq=1}) from the client device 2. The module 50 stores the second delta (799 in this example) in the entry in the connection table established for the connection between the client device 2 and the remote server 10. Subsequently, the module 50 uses the second delta to offset the acknowledgment numbers of packets input to the proxy server side socket 54 and to offset the sequence numbers of packets output from the Proxy server side socket 54.

Next, the Module 50 modifies the stored copy of the SYNACK packet (SYNACK_X{Seq=100, Ack=2}) to generate a modified SYNACK packet (SYNACK_X {Seq=100, Ack=801}) comprising the expected Sequence and ACK numbers for the server side socket 54 and, at step 140, injects the modified SYNACK packet (SYNACK_X {Seq=100, Ack=801}) into the proxy server side socket 54. The Module 50 drops the SYN packet (SYN_Y {Seq=800}) which has no further use.

In response to receiving the modified SYNACK packet (SYNACK_X {Seq=100, Ack=801}), the proxy server side socket 54 responds by generating an ACK packet (ACK_Y {Seq=801, Ack=101}) and, at step 142, sends the ACK packet (ACK_X {Seq=801, Ack=101}) which passes through the OUTPUT chain and is received by the Module 50 at the second hook. This completes a TCP three way handshake for the server side socket 54 which is now established. The Module 50 drops the ACK packet (ACK_X {Seq=801, Ack=101}) which has no further use.

Now that the proxy server side socket 54 is established, at step 144, a packet (HTTP_GET_X {Seq=801, Ack 101}) conveying a HTTP_GET request is sent from the proxy server side socket 54 to the remote server 10. The packet (HTTP_GET_X {Seq=801, Ack 101}) includes as its payload the payload of the modified packet (HTTP_GET_X {Seq=2, Ack=501} injected into the proxy client side socket 52, at step 130, possibly modified in accordance with any subsequent processing performed by one or more of the Proxy's applications. The packet (HTTP_GET_X{Seq=801, Ack 101}) further comprises sequence and acknowledgment numbers that are correct for the proxy server side socket 54.

The Module 50 receives the packet (HTTP_GET_X {Seq=801, Ack 101}) conveying a HTTP_GET request at the second hook and modifies it by mapping the sequence and acknowledgment numbers that are correct for the proxy server side socket 54 to the sequence and acknowledgment numbers that are correct for the remote server 10 to generate a modified packet (HTTP_GET_X {Seq=2, Ack 101}) conveying a HTTP_GET request.

At step 146, the module 50 sends the modified packet (HTTP_GET_X {Seq=2, Ack 101}) onwards to the first network node 6 and, referring now to FIG. 8 (part 2), at step

148 the first network node forwards the modified packet (HTTP_GET_X {Seq=2, Ack 101}) on to the remote server 10.

In response to receiving the packet (HTTP_GET_X {Seq=2, Ack 101}), in accordance with the TCP, the remote server 10 sends, at step 150, an Ack packet (HTTP_ACK_X {Seq=101, Ack=114}) back to the client device 2. As is standard in the TCP, the Ack number in the Ack packet (HTTP_ACK_X {Seq=101, Ack=114}) is the sum of the Sequence number in the HTTP_GET request (HTTP_GET_X {Seq=2, Ack 101}) and the length of the HTTP payload of the HTTP_GET request (HTTP_GET_X {Seq=2, Ack 101}). In this example, the Sequence number in the packet (HTTP_GET_X {Seq=2, Ack 101}) is 2 and the HTTP payload length is 112 bytes giving a sequence number in the Ack packet (HTTP_ACK_X {Seq=101, Ack=114}) of 114.

The first network node 6 intercepts the Ack packet (HTTP_ACK_X {Seq=101, Ack=114}) and, at step 152 forwards it to the second network node 12. The Ack packet (HTTP_ACK_X {Seq=101, Ack=114}) is received by the Module 50 at the third hook and the module modifies the Ack packet (HTTP_ACK_X {Seq=101, Ack=114}) by re-mapping its sequence and acknowledgement numbers to those of proxy server side socket 54 to provide the re-mapped Ack packet (HTTP_ACK_X {Seq=101, Ack=913}). Here, the Ack=913 value is the sum of the Ack value 114 and the second delta 799. At step 154, the Module 50 injects the re-mapped Ack packet (HTTP_ACK_X {Seq=101, Ack=913}) into the proxy server side socket 54 where it terminates.

At step 156, the remote server sends a packet (HTTP_200_X {Seq=101, Ack=114}) conveying a HTTP response to the client device 2.

The first network node 6 intercepts the packet (HTTP_200_X {Seq=101, Ack=114}) conveying the HTTP response and, at step 158, sends it to the second network node 12.

The Module 50 receives the packet (HTTP_200_X {Seq=101, Ack=114}) at the third hook. The Module 50 modifies the packet (HTTP_200_X {Seq=101, Ack=114}) by re-mapping its sequence and acknowledgement numbers to those of the proxy server side socket 54 and at step 160 injects the re-mapped packet (HTTP_200_X {Seq=101, Ack=913}) into the proxy server side socket 54.

In steps not shown in FIG. 8 (part 2), the payload of the packet (HTTP_200_X {Seq=101, Ack=913}) is passed to the Proxy 48 and possibly modified in accordance with processing performed by one or more of the Proxy's applications.

The Proxy 48 passes the payload, whether it has been modified or not, back to the Transport Layer and generates a packet (HTTP_200_X {Seq=501, Ack=114}) conveying a HTTP response that includes the payload and comprises the sequence and acknowledgement numbers for the proxy client side socket 52. At step 162, the packet (HTTP_200_X {Seq=501, Ack=114}) is sent from the proxy client side socket 52 and is received by the Module 50 at the second hook. The Module 50 modifies the packet (HTTP_200_X {Seq=501, Ack=114}) by re-mapping its sequence and acknowledgement numbers to those expected by the client device 102 and at step 164 sends the re-mapped packet (HTTP_200_X {Seq=101, Ack=114}) to the first network node 106.

The first network node 106 receives the re-mapped packet (HTTP_200_X {Seq=101, Ack=114}) and at step 166 forwards it to the client device 2.

In response to receiving the re-mapped packet (HTTP_200_X {Seq=101, Ack=114}) conveying the HTTP response, in accordance with the TCP, the client device 2 generates an Ack packet (HTTP_ACK(200)_X {Seq=114, Ack=219}) for acknowledging receipt of the re-mapped packet (HTTP_200_X {Seq=101, Ack=114}) and at, step 168, transmits the ACK packet (HTTP_ACK(200)_X {Seq=114, Ack=219}) to the remote server 10. As is standard in the TCP, the Ack number in the Ack packet (HTTP_ACK(200)_X {Seq=114, Ack=219}) is the sum of the Sequence number in the packet (HTTP_200_X {Seq=101, Ack=114}) and the length of the HTTP payload in the packet (HTTP_200_X {Seq=101, Ack=114}). In this example, the Sequence number in the packet (HTTP_200_X {Seq=101, Ack=114}) is 101 and the HTTP payload length is 118 bytes giving a sequence number in the Ack packet (HTTP_ACK(200)_X {Seq=114, Ack=219}) of 219.

The first network node 6 intercepts the ACK packet (HTTP_ACK(200)_X {Seq=114, Ack=219}) and, at step 170, diverts it to the second network node 12. The Module 50 receives the ACK packet (HTTP_ACK(200)_X {Seq=114, Ack=219}) at the third hook and modifies it by re-mapping its sequence and acknowledgment numbers to those for the proxy client side proxy 54 and at step 172, injects the re-mapped ACK packet (HTTP_ACK(200)_X {Seq=114, Ack=619}) into the proxy client side socket 52.

The sequence and acknowledgement numbers of the ACK packet (HTTP_ACK(200)_X {Seq=114, Ack=619}) are re-mapped to the sequence and acknowledgement numbers of the proxy server side socket 54 and, at step 174, the proxy server side socket 54 sends a re-mapped ACK packet (HTTP_ACK(200)_X {Seq=913, Ack=219}) comprising these sequence and acknowledgement numbers. The Module 50 receives the ACK packet (HTTP_ACK(200)_X {Seq=913, Ack=219}) at the second hook and modifies it by mapping its sequence and acknowledgement numbers to those of the remote server 10 and at step 176 sends the ACK packet (HTTP_ACK(200)_X {Seq=114, Ack=219}) to the first network node 106.

At step 178, the first network node forwards the ACK packet (HTTP_ACK(200)_X {Seq=114, Ack=219}) to the remote server 10.

Referring now to FIG. 8 Part 3, there is illustrated packets exchanged in order to close the connection between the client device 2 and the proxy client side socket 52 and to close the connection between the proxy server side socket 54 and the remote server 10.

As is standard when terminating a TCP connection, the tear-down of the connection between the client device 2 and the proxy client side socket 52 requires a FIN packet and an ACK packet to be sent by each (i.e. the teardown is a four-way handshake) and likewise for the tear-down of the connection between the proxy server side socket 54 and the remote server 10. For simplicity, in FIG. 8 part 3, only the exchange of the FIN packets is illustrated.

At step 180, the client device 2 transmits a FIN packet (FIN {Seq=114, Ack=219}) to the remote server 10. The first network node 6 intercepts the FIN packet (FIN {Seq=114, Ack=219}) and, at step 182, forwards it to the second network node 12.

The module 50 receives the FIN packet (FIN {Seq=114, Ack=219}) at the third hook and modifies it by mapping its sequence and acknowledgment numbers to those of the proxy client side socket 52. At step 184, the module 50 injects the modified FIN packet (FIN {Seq=117, Ack=619}) into the proxy client side socket 52.

In response to receiving the modified FIN packet (FIN {Seq=117, Ack=619}), the client side socket transmits 52 an ACK packet although for simplicity this is not illustrated in the Figure.

At step 186, the client side socket 52 transmits a FIN packet (FIN {Seq=619, Ack=118}). The module 50 receives the FIN packet (FIN {Seq=619, Ack=118}) at the second hook and modifies it by mapping its sequence and acknowledgment numbers to those of the client side device 2 and at step 188 sends the modified FIN packet (FIN {Seq=219, Ack=118}) to the client device 2.

The first network node 6 intercepts modified FIN packet (FIN {Seq=219, Ack=118}) and at step 190 forwards it to the client device 2.

In response to receiving the modified FIN packet (FIN {Seq=219, Ack=118}), the client device 2 transmits an ACK packet (although for simplicity this is not illustrated) and closes a predetermined wait time T1 after doing so. The client side socket 52 is closed after this ACK packet is received although again, this is not illustrated in the Figure.

At step 192, the server side socket 54 transmits a FIN packet (FIN {Seq=913, Ack=219}) to initiate the 4 way handshake to close the connection with the remote server 10. The module 50 receives the FIN packet (FIN {Seq=913, Ack=219}) at the second hook and modifies it by mapping its sequence and acknowledgment numbers to those of the remote server 10 and at step 194 sends the modified FIN packet (FIN {Seq=114, Ack=219}) onwards. The first network node 106 intercepts the modified FIN packet (FIN {Seq=114, Ack=219}) and at step 196 forwards it to the remote server 10.

In response to receiving the modified FIN packet (FIN {Seq=114, Ack=219}), the remote server 10 transmits an ACK packet which is passed back to the server side socket although for simplicity this is not shown in the Figure.

At step 198, the remote server 10 transmits a FIN packet (FIN {Seq=219, Ack=115}) which is intercepted by the first network node 6.

At step 200, the first network node 6 forwards the FIN packet (FIN {Seq=219, Ack=115}) to the second network node 12. The module 50 receives the FIN packet (FIN {Seq=219, Ack=115}) at the third hook and modifies it by mapping its sequence and acknowledgment numbers to those of the server side socket and at step 202 injects the modified FIN packet (FIN {Seq=219, Ack=914}) into the server side socket.

In response to receiving the modified FIN packet (FIN {Seq=219, Ack=914}), the server side socket 54 transmits an ACK packet (although again for simplicity this is not illustrated in the Figure) and closes a predetermined wait time T2 after doing so. The remote server 10 closes a predetermined time T3 after it receives this ACK packet.

In one example, the module 50 sees FIN and FIN_ACK packets as data packets and hence cannot determine from them that the operating system at the TCP layer has shut down the Proxy client side socket 52 or the Proxy server side socket 54. Accordingly, in this example, Netfilter is arranged (via registered call backs) to send a message (not shown) to the module 50 to inform the module 50 that the client side connection and the server side connection are closed. When so informed, the module 50 deletes the entry from its connection table for the client side connection and the server side connection.

Figure 9:
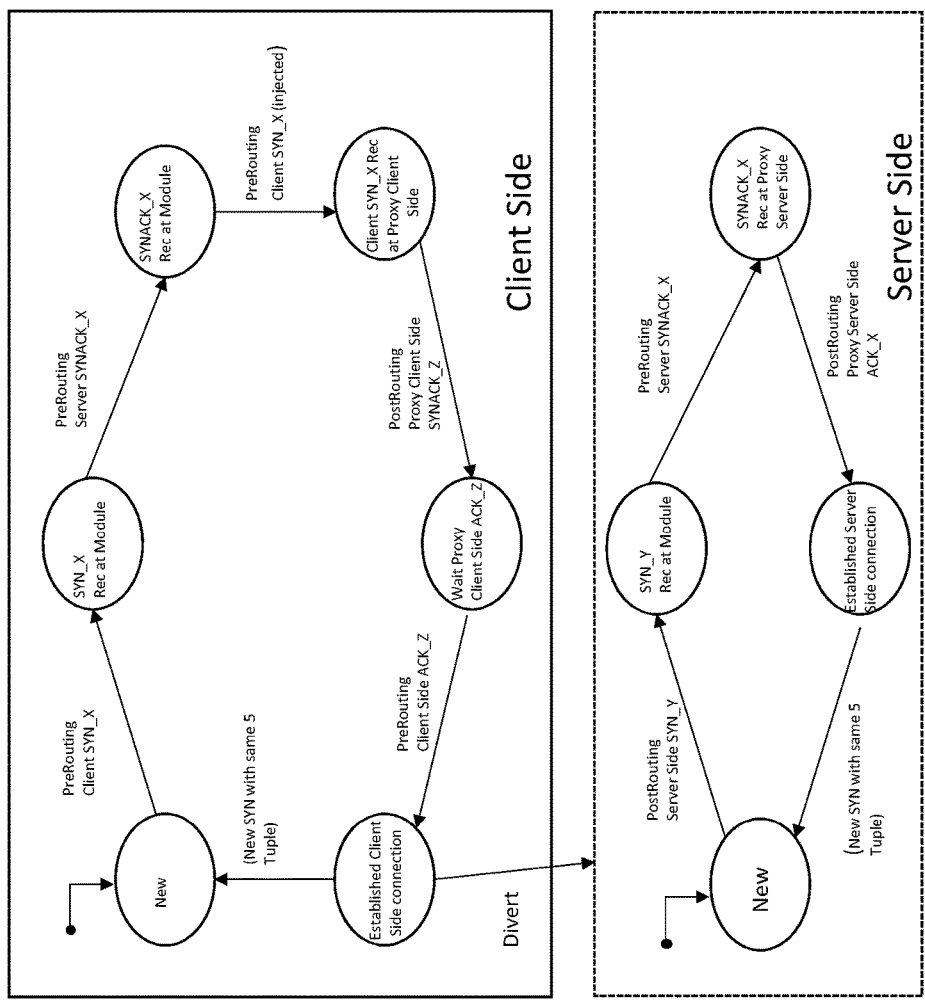
FIG. 9 illustrates a State diagram.

Referring to FIG. 9, there is illustrated a State Diagram showing state transitions followed by the module 50 for the establishment of the Proxy client side connection between the Proxy client side socket 52 and the client device 2 (upper half of FIG. 9) and the establishment of the Proxy server side connection between the Proxy server side socket 54 and the server 10 (lower half of FIG. 9).

In respect of the proxy client side connection, the reception by the Module 50 at the first hook of the packet SYN_X forwarded by the first network node 6 in step 114 of FIG. 8 causes the transition from the 'NEW' state to the 'SYN_X RECEIVED at MODULE' state. Next, the reception by the module 50 of the packet SYNACK_X forwarded by the first network node 6 in step 118 of FIG. 8 causes the transition to the 'SYNACK_X RECEIVED at MODULE' state. Next, the injection of the packet SYN_X by the module 50 in step 120 of FIG. 8 causes the transition to the 'SYN_X received at Proxy Client Side Socket' state. Next, the reception at the module 50 of the packet SYNACK_Z sent by the Proxy client side socket 52 in step 122 of FIG. 8 causes the transition to the 'Wait Proxy client socket ACK_Z' state. Next, the sending of the packet ACK_Z by the module 50 to the Proxy client side socket 52 in step 124 causes the transition to the 'Established Client Side connection' state.

If the module 50 receives, at the third hook, a new SYN packet containing the same 5 Tuple information as for the existing connection (this may happen for example, if the client device initiates a new TCP connection to the remote server 10 before the module 50 has been informed that the existing connection is terminated) then this cause a transition back the 'New' state so that a new entry can be created for a new connection.

In respect of the server side socket 54, the reception of the packet SYN_Y sent by the server side socket 54 at step 138 in FIG. 8 causes a transition from the 'NEW' state to the 'SYN_Y RECEIVED at MODULE' state. Next, the sending of the packet SYNACK_X by the module 50 to the proxy server side socket 54 in step 140 of Figure causes a transition to a 'SYN_Y RECEIVED at Proxy Server Side Socket' state. Next, the reception by the module 50 of the packet ACK_X sent by the proxy server side socket 52 in step 142 of FIG. 8 causes the transition to the 'Established Server Side Connection' state. Reception of a message from Conntrack indicating that the Proxy server side connection is closed causes a transition back to the 'New' state. As with Proxy client side connection, if the module 50 receives, at the third hook, a new SYN packet containing the same 5 Tuple information as for the existing connection this causes a transition back the 'New' state so that a new entry can be created for a new connection.

In the above described example, the TCP options Timestamps and Selective acknowledgements (SACK) are not shown but it will be appreciated that they can be re-mapped in a similar fashion as the sequence and acknowledgment numbers. To this end, deltas for the timestamps and SACK numbers may be determined and applied in a similar way as described above for the sequence numbers and acknowledgement numbers.

The module 50 may ensure that the timestamps option on the connection between the Proxy client side socket 52 and the client socket and also the timestamps option on the connection between the Proxy server side socket 54 and the server socket are aligned with the original client-server negotiated timestamps option. In addition, if timestamps is enabled on those connections, the module 50 rewrites the TCP timestamp values in the headers of packets it receives from the Proxy client side socket 52 and from the Proxy server side socket 54 to align with the values used by the client 2 and the server 10 and vice versa.

Assuming that the Proxy 48 is configured to advertise in its SYN and SYN-ACK packets support for TCP timestamps, the table below, for each row, indicates in the third column what action the Module 50 must take to provide the result indicated in the fourth column, based on the state of timestamp enablement at the Client device 2 (indicated in the first column) as learnt from the option field in the client device 2 SYN and the state of timestamp enablement at the server 10 (as indicated in the second column) as learnt from the option filed in the server 10 SYN-ACK.

| Client 2 | Server 10 | Module 50 | Proxy 48 |
|---|---|---|---|
| Timestamps Enabled | Timestamps Enabled | Action - leave timestamp option intact | Timestamps Enabled on client & server connection |
| Timestamps Disabled | Timestamps Enabled | Action - remove timestamp option from server's 10 SYN-ACK | Timestamps disabled on client & server connection |
| Timestamps Enabled | Timestamps Disabled | Action - remove timestamp option from client device's 2 SYN | Timestamps disabled on client & server connection |
| Timestamps Disabled | Timestamps Disabled | Action - none | Timestamps disabled on client & server connection |

The use of TCP Selective acknowledgements is negotiated by the client 2 and the server 10 when the TCP connection between them is being established. TCP SACK is enabled for the connection if SACK is enabled at both the client 2 and the server 10 or is disabled for the connection if SACK is disabled at at least one of the client 2 and the server 10.

Assuming that the Proxy 48 is configured to advertise in its SYN and SYN-ACK packets support for TCP SACK, the table below, for each row, indicates in the third column what action the Module 50 must take to provide the result indicated in the fourth column, based on the state of SACK enablement at the Client device 2 (as indicated in the first column) as learnt from the option field in the client device 2 SYN and the state of SACK enablement at the server 10 (as indicated in the second column) as learnt from the option filed in the server 10 SYN-ACK.

| Client 2 | Server 10 | Module 50 | Proxy 48 |
|---|---|---|---|
| SACK Enabled | SACK Enabled | Action - leave SACK option intact | SACK Enabled on client & server connection |
| SACK Disabled | SACK Enabled | Action - remove SACK option from server's 10 SYN-ACK | SACK disabled on client & server connection |
| SACK Enabled | SACK Disabled | Action - remove SACK option from client device's 2 SYN | SACK disabled on client & server connection |
| SACK Disabled | SACK Disabled | Action - none | SACK disabled on client & server connection |

When SACK is enabled on the connection between the Proxy 48 and the client 2 and on the connection between the Proxy 48 and the server 10, when a SACK event occurs during the flow the module 50 re-maps the TCP sequence numbers contained in the SACK option from the Proxy's sequence number range to the client 2/server 10 sequence number range.

In practice, nearly all TCP clients have the window scaling option enabled and the default window scaling settings advertised in a TCP 3 way handshake vary according to the operating system of the client and server. Accordingly, the default window scaling settings used in TCP 3 way handshake between the client 2 and the server 10 will vary according to the operating system of the client and server. As is known, the value of window size field in the header of TCP packet indicates the number of window size units (by default bytes) that sender of the packet is willing to receive and the window scale value advertised by that sender indicates the scaling factor that can be applied to the window size.

In one example the proxy 48 has TCP window scaling enabled and is arranged to advertise the default Linux window scaling settings on both the client side connection (e.g. in the SYN-ACK packet sent form the client side socket 52) and server side connection (e.g. in the SYN packet sent form the server side socket 54). In one example, the module 50, based on the window scaling information from the client device's 2 SYN, the server's 10 SYN-ACK, the Proxy's 48 SYN and the Proxy's SYN-ACK is arranged to determine Window Size re-numbering information that it stores in the relevant entry in its connection table and uses to re-value the value of the TCP window size in the header of each TCP packet sent from the client side socket 52 and to re-value the value of the TCP window size in the header of each packet sent from the server side socket 54 server so that they are aligned with the client device 2 and server 10 negotiated window scaling values.

For example, if the server 10 has advertised a x8 window scaling factor to the client device 2 but the proxy's 48 default window scaling factor for the client side socket 52 is only x4, the module 50 would halve the window size value in every packet output from the proxy client side socket 52 before sending it to the client device 2, to take account of the fact that the client device 2 will apply a window scaling factor of x8 as advertised by the server 10. Similar re-valuings may be applied to the window size value in every packet output from the server side socket 55 before sending it to the server 10 to take account of the fact that the server 10 will apply whatever window scaling factor was advertised by the client device 2.

It will be appreciated, that in the above example, the messaging is fully '5tuple transparent', that is to say, the source IP address, the source port, the destination IP address, the destination port, and the protocol indicated in the packets sent to or from the client device 2 and the remote server 10 remain unchanged.

Additional Details and Modifications

In some examples, the processing system 30 at the first network node 6 may comprise a plurality of separate Packet Processing Units (PPU) and the processing system 30 is arranged to load balance traffic flow across the PPU's. Accordingly, all of the traffic in a given flow between the client device 2 and the remote server 10 is handled by the same PPU. The PPU handling a flow includes its MAC address as the source MAC address in each packet it directs to the second network node 12. In this case, on the POSTROUTE, the Module 50 is arranged so as to include that MAC address as the destination MAC address is each packet directed in the flow directed to the first network node 6 to ensure that that packet is subsequently handled by the correct PPU.

In the example described above, the first network node 6 is configured in a 'HTTP divert' mode. In the HTTP divert mode, the first network node 6 is configured to divert HTTP traffic between the client device 2 and the sever 10 via the second network node 12. The first network node 12 identifies that the traffic is HTTP traffic by inspecting the HTTP GET sent by the client device 2 at step 112 and in response to identifying this as a HTTP GET sends the SYN packet to the second network node 12 at step 114. In an alternative example, the first network node 6 may be configured to divert traffic between the client device 2 and the sever 10 via the second network node 12 based on the destination port set in the SYN packet sent by the client device 2 in step 100. For example, the first network node 6 may be configured to divert the traffic if the destination port in the SYN packet is port 80 (i.e. the port conventionally used for HTTP traffic). When the first network node 6 is configured in this mode, the messaging sequence used by first network node 6 to send the SYN/SYNACK/ACK packets to the second network node 12 may be slightly different from that shown in FIG. 8. For example, the SYN packet (SYN_X {Seq=1}) is sent from the first network node 6 to the remote server 10 as per step 102 in FIG. 8 and the SYNACK packet (SYNACK_X {Seq=100, Ack=2}) is transmitted by the remote server 110 as per step 104 in FIG. 8.

In this alternative example, unlike in the example of FIG. 8, in response to the SYNACK packet (SYNACK_X {Seq=100, Ack=2}) being received from the remote server 10, the first network node 6 sends the copy the SYN packet (SYN_X{Seq=1}) to the second network node 12 and in response to receiving the copy the SYN packet (SYN_X {Seq=1}) back from the second network node 12, then sends the copy of the SYNACK packet (SYNACK_X {Seq=100, Ack=2}) to the second network node 12. In this example, the first node 106 delays sending the SYNACK packet (SYNACK_X {Seq=100, Ack=2}) onto the client device 2 until it receives the copy of that SYNACK packet (SYNACK_X {Seq=100, Ack=2}) back from the module 50. Accordingly, in this example, the module 50 can modify the SYNACK packet (SYNACK_X {Seq=100, Ack=2}) and it is this modified SYNACK packet (SYNACK_X {Seq=100, Ack=2}) that the first network node 6 sends to the client device 2.

Advantageously, for example, the modified SYNACK packet (SYNACK_X {Seq=100, Ack=2}) sent back to the client device 2 may include one or more TCP options or window size parameters from the client side socket SYNACK packet (SYNACK_Z {Seq=500, Ack=2}). This, in effect, allows the HTTP proxy 48 to set TCP options on the client side connection and hence provide TCP optimization on the client connection. For example, the HTTP proxy 48 may provide the TCP congestion control algorithm for the client connection, which often will be over a radio connection.

In this example, the first network node 6 diverts the client Ack packet (ACK_X {Seq=2, Ack=101}) to the second network node and does not forward it to the remote server 10 and so the remote server never receives this packet. Instead, the Proxy 48 is configured to set the ACK bit in the packet header of the packet (HTTP_GET_X {Seq=801, Ack 101}) conveying a HTTP_GET request (see step 144 in FIG. 8 part 1) so that this packet serves to complete the 3 way hand shake at the remote server 10.

In the example described above, the packets received at the client side socket 52 from the client device 2 and the packets sent from the client side socket 52 to the client device 2 are all routed via the first network node 6. Likewise, the packets received at the server side socket 54 from the remote server 10 and the packets sent from the server side socket 52 to the remote server 10 are all routed via the first network node 6. In an alternative example, the packets received at the server side socket 54 from the remote server 10 and the packets sent from the server side socket 52 to the remote server 10 are not routed via the first network node 6 but instead pass directly between the second network node 12 and the remote server 10 via the network 8. In this example, the second network node is provided with a further interface (not shown) for communicating directly with the remote server 10 via the network 8 (i.e. not via the first network node 6). The packets sent from the second network node to the 12 to the remote server 10 over the further interface have the IP address of the second network node 12 and the port of the Proxy 48 as their source IP address and source port, and the IP address of the remote server 10 and relevant port of the remote server 10 as their destination IP address and destination port. Packets received at the second network node 12, over the further interface, from the remote server 10 have the IP address of the remote server 10 and a port of the remote server 10 as their source IP address and source port, and the IP address of the second network node 12 and a port of the second network node 12 as their destination IP address and destination port.

In this example, packets received from and sent to the client device pass over the interface to the first network node 6 as described above with respect to the first example.

In some examples, in full divert mode, the second network node 12 comprises a first interface connected to a corresponding first interface at the first network node and a second interface connected to a corresponding second interface at the first network node 6. Packets from the client device 2 arrive at the second network node 6 via the first network node 6 over one of the interfaces (say the first interface) and packets from the server 10 arrive at the second network node 6 via the first network node 6 over one of the other interface (say the second interface). In this arrangement, packets from the second node 6 to the client device 2 are sent over the first interface and via the first network node 6 and packets from the second network node 12 to the server 10 are sent over the second interface and via the first network node 6. This arrangement replicates the traffic flow the second network node 12 would see if it were directly in line between the client device 2 and the server 10. This arrangement requires an IP address to be configured on each interface at the second network node 12 to enable the first network node 6 to obtain the necessary MAC address for each interface using, for example, the standard Address Resolution Protocol (ARP).

In some examples, the connection tracking module (conntrack) is arranged to signal to the module 50 that a connection is terminated only after both the proxy client side socket 52 and the proxy server side socket 54 are closed.

In one example, the proxy's 48 TCP connection to the remote server 10 remains open for downloading the content into a cache at the second network node 6, even though the client device 2 has closed its connection. In this example, the connection tracking module (conntrack) reports connection termination only when the remote server 10 connection closes.

In a second example, the Proxy's 48 client side socket to the client device 2 remains open, for example, because data is being streamed from a cache at the second network node 12 and the Proxy's server side socket to the remote server 10 is closed. In this example, the connection tracking module (conntrack) reports connection termination to the module 50 only when the client device 2 connection closes.

In some examples, the module 50 implements one or more timers that are used to ensure that entries in its connection table are properly deleted.

In one example, the module 50 implements a first timer which it uses to delete any entry in its connection table which gets created when a SYN packet arrives at the module 50 from the first network node 6 but which entry then becomes stuck because the handshake necessary to step up the client side socket 52 and/or the server side socket 54 is never completed. This may happen, for example, if the SYNACK packet is not subsequently received from the first network node 6. The module 50 starts the first timer when a connection entry is created and stops the timer when the handshakes necessary to step up the client side socket 52 and/or the server side socket 54 is/are completed. If the first timer expires, the module 50 deletes the entry.

When the connection between the client side socket 52 and the client 2 has a low bandwidth (e.g. because the connection includes a low bandwidth radio link), in some scenarios, it is possible that that the proxy server 48 will continue to deliver buffered data to the client device 2 for a relatively long period after the remote server 10 has delivered that data to the proxy server 48. In such a scenario, the remote server 10 may initiate an exchange of FINACK and ACK packets between its socket and the server side socket 54 and closes its socket before all of the data has been delivered to the client device. The closure of the server connection causes Conntrack to go into Time_Wait (TW) timeout and when that period expires to issue a message to the module 50 to delete its entry for the connection between the client 2 and server 10 from its connection table. To mitigate against this possibility, the module 50 may be configured so that if it receives such a message from Conntrack but has not seen a FINACK packet for the client side socket 52, rather than deleting the entry, it instead starts a second timer which is reset each time a packet from the client side socket 52 to the client device 2 is received by the module 50. When all the packets to the client device 2 have been sent, the second timer expires and the Module 50 then removes the entry from its connection table.

The module 50 may further implement a third timer to mitigate against netfilter failing, for whatever reason, to send a message to the Module 50 to delete an entry for a connection after the connection has been properly closed. For example, the third timer may be started when a client FINACK is received at the Module 50 and will expire after a reasonable set time if, in the meantime, no message is received from netfilter instructing the module 50 to delete the entry from its connection table. If the third timer expires, the module 50 deletes the entry from its table. The third timer may be re-started each time data is received over the server side socket 54 to enable the proxy 48 to complete the caching of data from the server 10 before the entry is deleted.

Whereas in the above described embodiments the transport layer protocol is the TCP and end points are TCP sockets, in other embodiments other transport layer protocols and socket types may be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. An apparatus for managing connections in a communication network, the apparatus comprising:
   at least one processor;
   and at least one memory including computer program code;
   the at least one memory and the computer program code being configured to, with the at least one processor, cause the apparatus at least to perform:
   receiving a first packet that is, or is a copy of, a packet sent from a transport protocol first socket at a first entity in the communication network to a second entity in the communication network;
   receiving a second packet that is, or is a copy of, a packet sent from a transport protocol second socket at the second entity to the first entity in response to the second entity receiving the packet or a copy of the packet sent from the transport protocol first socket, wherein the first packet and the second packet are received from a third entity that is intermediate to the first entity and the second entity in the communication network;
   using the first packet and the second packet in a process to establish a transport protocol third socket and a transport protocol fourth socket at a fourth entity in the communication network, wherein the transport protocol third socket is for communicating with the transport protocol first socket at the first entity and the transport protocol fourth socket is for communicating with the transport protocol second socket at the second entity, wherein the process to establish a transport protocol third socket and a transport protocol fourth socket comprises inputting the first packet to the transport protocol third socket, receiving a third packet from the transport protocol third socket in acknowledgment of the first packet, the third packet including third header field value information, receiving a fifth packet from the transport protocol fourth socket, the fifth packet including fourth header field value information,
   establishing header field re-valuing information based at least in part on first header field value information obtained from the first packet, second header field value information obtained from the second packet, the third header field value information and the fourth header filed value information, wherein the header field re-valuing information comprises a first delta determined as a difference between a value of a header field of the second packet and a value of a header field of the third packet and a second delta determined as a difference between a value of a header field of the first packet and a value of a header field of a fourth packet, re-valuing a value of a header field in the second packet based on the second delta, and then inputting the second packet into the transport protocol fourth socket to acknowledge the fifth packet;
   re-valuing one or more header field values in a subsequent received packet based on the header field re-valuing information, either prior to the subsequent packet being input to the transport protocol third socket or the transport protocol fourth socket or subsequent to the subsequent packet being output from the transport protocol third socket or the transport protocol fourth socket.

2. The apparatus of claim 1 wherein the header field of the second packet is a sequence number field and the header field of the third packet is a sequence number field.

3. The apparatus of claim 1, the at least one memory and the computer program code being configured to, with the at least one processor, cause the apparatus to perform:
  inputting the fourth packet to the transport protocol third socket in acknowledgment of the third packet thereby completing a first packet handshake procedure to establish the transport protocol third socket.

4. The apparatus of claim 1 wherein the header field of the first packet is a sequence number field and the header field of the fourth packet is a sequence number field.

5. The apparatus of claim 1, the at least one memory and the computer program code being configured to, with the at least one processor, cause the apparatus to perform:
  receiving a sixth packet from the transport protocol fourth socket to acknowledge the second packet, thereby completing a second packet handshake procedure to establish the transport protocol fourth socket.

6. The apparatus of claim 1 wherein the one or more header field values in the subsequent packet comprises one or more of a sequence number, an acknowledgement number, a timestamp and a window size.

7. The apparatus of claim 6 wherein the sequence number is a selective sequence number.

8. The apparatus of claim 1, the at least one memory and the computer program code being configured to, with the at least one processor, cause the apparatus to perform: using the first delta to re-value a value of an acknowledgment number field of a subsequent packet prior to inputting the subsequent packet to the transport protocol third socket or using the first delta to re-value a value of a sequence number field of a subsequent packet subsequent to receiving the subsequent packet from the transport protocol third socket.

9. The apparatus of claim 1, the at least one memory and the computer program code being configured to, with the at least one processor, cause the apparatus to perform: using the second delta to re-value a value of an acknowledgment number field of a subsequent packet prior to inputting the subsequent packet to the transport protocol fourth socket or using the second delta to re-value a value of a sequence number field of a subsequent packet subsequent to receiving the subsequent packet from the transport protocol fourth socket.

10. The apparatus of claim 1, the at least one memory and the computer program code being configured to, with the at least one processor, cause the apparatus to perform:
  identifying based on an options field in the first packet and/or an options field in the second packet one or more connection options enabled for a transport layer connection between the transport protocol first socket at the first entity and the transport protocol second socket at the second entity;
  causing the same one or more connection options to be enabled on a second transport layer connection between the transport protocol first socket and the transport protocol third socket and/or on a third transport layer connection between the transport protocol second socket and the transport protocol fourth socket.

11. The apparatus of claim 10 wherein the one more connection options comprise at least one of a transport protocol window scaling option and a timestamps option.

12. The apparatus of claim 1, wherein the at least one processor and the at least one memory including computer program code are at the fourth entity and the computer program code is part of an operating system kernel module.

13. The apparatus of claim 12 wherein the operating system kernel module receives the first packet and the second packet at a first hook in a pre-routing or input chain of a networking subsystem of an operating system running on the at least one processor at the fourth entity.

14. The apparatus of claim 12 wherein the kernel module receives the subsequent packet at a second hook in a post-routing chain or output chain of a networking subsystem of the operating system running on the at least one processor at the fourth entity prior to re-valuing one or more header field values in the subsequent received packet and subsequent to the subsequent received packet being output from the transport protocol third socket or the transport protocol fourth socket.

15. The apparatus of claim 12 wherein the kernel module receives the subsequent packet at a third hook in a pre-routing chain or input chain of a networking subsystem of an operating system running on the at least one processor at the fourth entity prior to re-mapping the one or more packet numbers and prior to the subsequent packet being input to the transport protocol third socket or the transport protocol fourth socket.

16. The apparatus of claim 13 wherein the kernel module is arranged to create an entry in a connection table to store the header field re-valuing information.

17. The apparatus of claim 16 wherein the kernel module receives a message from the networking subsystem of the operating system indicating that it should delete the entry.

18. The apparatus of claim 17 wherein the kernel module starts a timer when the message is received and deletes the entry if the time expires and wherein the kernel module restarts the timer if the timer is counting down and a packet for the transport protocol fourth socket is received or a packet from the transport protocol third socket is received.

19. The apparatus of claim 1, wherein the transport protocol third socket and the transport protocol fourth socket are for a Proxy server running at a processing system at the fourth entity and/or the transport protocol is the TCP.

20. A method for managing connections in a communication network, the method comprising:
  receiving a first packet that is, or is a copy of, a packet sent from a transport protocol first socket at a first entity in the communication network to a second entity in the communication network;
  receiving a second packet that is, or is a copy of, a packet sent from a transport protocol second socket at the second entity to the first entity in response to the second entity receiving the packet or a copy of the packet sent from the transport protocol first socket, wherein the first packet and the second packet are received from a third entity that is intermediate to the first entity and the second entity in the communication network;
  using the first packet and the second packet in a process to establish a transport protocol third socket and a transport protocol fourth socket at a fourth entity in the communication network, wherein the transport protocol third socket is for communicating with the transport protocol first socket at the first entity and the transport protocol fourth socket is for communicating with the transport protocol second socket at the second entity, wherein the process to establish a transport protocol third socket and a transport protocol fourth socket comprises inputting the first packet to the transport protocol third socket, receiving a third packet from the transport protocol third socket in acknowledgment of the first packet, the third packet including third header field value information, receiving a fifth packet from the transport protocol fourth socket, the fifth packet including fourth header field value information, establishing header field re-valuing information based at least in part on first header field value information obtained from the first packet, second header field value information obtained from the second packet, the third header field value information and the fourth header filed value information, wherein the header field re-valuing information comprises a first delta determined as a difference between a value of a header field of the second packet and a value of a header field of the third packet and a second delta determined as a difference between a value of a header field of the first packet and a value of a header field of a fourth packet, re-valuing a value of a header field in the second packet based on the second delta, and then inputting the second packet into the transport protocol fourth socket to acknowledge the fifth packet;

re-valuing one or more header field values in a subsequent received packet based on the header field re-valuing information, either prior to the subsequent packet being input to the transport protocol third socket or the transport protocol fourth socket or subsequent to the subsequent packet being output from the transport protocol third socket or the transport protocol fourth socket.

21. A non-transitory computer-readable storage medium comprising a set of computer-readable instructions stored thereon, which, when executed by a processing system cause the processing system to perform the method of:

receiving a first packet that is, or is a copy of, a packet sent from a transport protocol first socket at a first entity in the communication network to a second entity in the communication network;

receiving a second packet that is, or is a copy of, a packet sent from a transport protocol second socket at the second entity to the first entity in response to the second entity receiving the packet or a copy of the packet sent from the transport protocol first socket, wherein the first packet and the second packet are received from a third entity that is intermediate to the first entity and the second entity in the communication network;

using the first packet and the second packet in a process to establish a transport protocol third socket and a transport protocol fourth socket at a fourth entity in the communication network, wherein the transport protocol third socket is for communicating with the transport protocol fourth socket at the first entity and the transport protocol fourth socket is for communicating with the transport protocol second socket at the second entity, wherein the process to establish a transport protocol third socket and a transport protocol fourth socket comprises inputting the first packet to the transport protocol third socket, receiving a third packet from the transport protocol third socket in acknowledgment of the first packet, the third packet including third header field value information, receiving a fifth packet from the transport protocol fourth socket, the fifth packet including fourth header field value information, establishing header field re-valuing information based at least in part on first header field value information obtained from the first packet, second header field value information obtained from the second packet, the third header field value information and the fourth header filed value information, wherein the header field re-valuing information comprises a first delta determined as a difference between a value of a header field of the second packet and a value of a header field of the third packet and a second delta determined as a difference between a value of a header field of the first packet and a value of a header field of a fourth packet, re-valuing a value of a header field in the second packet based on the second delta, and then inputting the second packet into the transport protocol fourth socket to acknowledge the fifth packet;

re-valuing one or more header field values in a subsequent received packet based on the header field re-valuing information, either prior to the subsequent packet being input to the transport protocol third socket or the transport protocol fourth socket or subsequent to the subsequent packet being output from the transport protocol third socket or the transport protocol fourth socket.

* * * * *